(12) United States Patent
Koide et al.

(10) Patent No.: US 7,533,185 B2
(45) Date of Patent: May 12, 2009

(54) DATA COMMUNICATION METHOD, SYSTEM AND PROGRAM USING UNICAST AND MULTICAST COMMUNICATIONS

(75) Inventors: Masami Koide, Tokyo (JP); Akira Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 713 days.

(21) Appl. No.: 10/372,960

(22) Filed: Feb. 26, 2003

(65) Prior Publication Data

US 2003/0182446 A1 Sep. 25, 2003

(30) Foreign Application Priority Data

Mar. 22, 2002 (JP) .............................. 2002-082056

(51) Int. Cl.
*G06F 15/173* (2006.01)
(52) U.S. Cl. .................................................... 709/238
(58) Field of Classification Search ................ 709/227, 709/240, 203, 204, 219, 230, 231, 223, 224; 370/236, 352, 260, 261, 392; 714/748; 715/500; 717/130; 707/1; 348/14.09; 725/109; 710/11
See application file for complete search history.

(56) References Cited

U.S. PATENT DOCUMENTS

| | | | |
|---|---|---|---|
| 4,947,202 A | | 8/1990 | Kitajima et al. |
| 5,069,543 A | | 12/1991 | Kitajima et al. |
| 5,572,678 A | * | 11/1996 | Homma et al. ............... 709/227 |
| 5,594,872 A | * | 1/1997 | Kawano et al. .............. 709/240 |
| 5,619,301 A | | 4/1997 | Suzuki et al. |
| 5,760,896 A | | 6/1998 | Suzuki |
| 6,138,144 A | * | 10/2000 | DeSimone et al. ........... 709/204 |
| 6,151,696 A | * | 11/2000 | Miller et al. ................. 714/748 |
| 6,173,314 B1 | * | 1/2001 | Kurashima et al. .......... 709/204 |
| 6,209,004 B1 | * | 3/2001 | Taylor ......................... 715/500 |
| 6,404,745 B1 | * | 6/2002 | O'Neil et al. ................ 370/260 |
| 6,415,327 B1 | * | 7/2002 | Beckerman et al. .......... 709/231 |
| 6,426,773 B1 | | 7/2002 | Suzuki |
| 6,466,550 B1 | * | 10/2002 | Foster et al. ................. 370/261 |
| 6,509,925 B1 | * | 1/2003 | Dermler et al. .......... 348/14.09 |
| 6,577,599 B1 | * | 6/2003 | Gupta et al. ................. 370/236 |
| 6,832,367 B1 | * | 12/2004 | Choi et al. ................... 717/130 |

(Continued)

FOREIGN PATENT DOCUMENTS

JP  11-017713  1/1999

(Continued)

OTHER PUBLICATIONS

U.S. Appl. No. 09/329,341, filed Jun. 10, 1999, Suzuki.

(Continued)

*Primary Examiner*—Dustin Nguyen
(74) *Attorney, Agent, or Firm*—Oblon, Spivak, McClelland, Maier & Neustadt, P.C.

(57) ABSTRACT

In a data communication method, when packet data are sent and received among a plurality of computers connected each other via the network, communications are established by using a unicast connection. Then, the packet data are sent by selectively using a multicast communication and the unicast communication for at least one computer to which the communication is established. As a result, it is possible to reduce an amount of network traffic under a peer-to-peer network without intermediation of a server and improve reliability of the multicast communication.

25 Claims, 20 Drawing Sheets

U.S. PATENT DOCUMENTS

| | | | |
|---|---|---|---|
| 6,990,513 B2 * | 1/2006 | Belfiore et al. | 709/203 |
| 7,139,813 B1 * | 11/2006 | Wallenius | 709/219 |
| 7,191,241 B2 * | 3/2007 | Boucher et al. | 709/230 |
| 7,444,438 B2 * | 10/2008 | Saint-Hilaire et al. | 710/11 |
| 7,466,707 B2 * | 12/2008 | Onoe et al. | 370/392 |
| 2002/0191594 A1 * | 12/2002 | Itoh et al. | 370/352 |
| 2003/0005054 A1 * | 1/2003 | El-Gebaly et al. | 709/204 |
| 2003/0014391 A1 * | 1/2003 | Evans et al. | 707/1 |
| 2003/0182446 A1 | 9/2003 | Koide et al. | |
| 2005/0071459 A1 * | 3/2005 | Costa-Requena et al. | 709/224 |
| 2005/0141507 A1 * | 6/2005 | Curtis | 370/392 |

FOREIGN PATENT DOCUMENTS

| | | |
|---|---|---|
| JP | 11-161622 | 6/1999 |
| JP | 2000-022687 | 1/2000 |

OTHER PUBLICATIONS

U.S. Appl. No. 10/183,613, filed Jun. 28, 2002, Suzuki et al.
U.S. Appl. No. 10/372,960, filed Feb. 26, 2003, Koide et al.
U.S. Appl. No. 10/743,092, filed Dec. 23, 2003, Suzuki et al.
U.S. Appl. No. 11/495,669, filed Jul. 31, 2006, Mori, et al.
M. Handley, et al., "SIP: Session Initiation Protocol", Network Working Group, Mar. 1999, 8 pages.
U.S. Appl. No. 11/580,128, filed Oct. 13, 2006, Suzuki, et al.

* cited by examiner

FIG.5

| OPERATION | EXTENDED PROGRAM | TAG |
|---|---|---|
| TEXT DISPLAY | Text Panel | TEXT |
| STILL IMAGE DISPLAY | Image Panel | IMAGE |
| MOVING IMAGE DISPLAY | Movie Panel | MOVIE |
| 3D DISPLAY | 3D Panel | 3D |
| ⋮ | ⋮ | ⋮ |

FIG.6

```
<DOCUMENT>                ← TAG

<TEXT> CONFERENCE MINUTES<TEXT/>
                      ← TEXT CONTENTS

<TEXT FILE = "BODY.TEXT"/>
                      ← ATTRIBUTE

<IMAGE FILE = "IMAGE. JPG" X ="100" Y="10"
    WIDTH="100" HEIGHT="100" />

</DOCUMENT>
```

| MEDIA FORMAT | EXTENDED PROGRAM |
|---|---|
| Motion JPEG | MJ Panel |
| MPEG 2 | MP Panel |
| Windows AVI | AV Panel |
| ⋮ | ⋮ |

| g | b | c |
|---|---|---|
| masami | 133.139.×××.16 | dole |
| suzuki | 133.139.○○○.20 | nohohon |
| hase | 133.139.□□□.26 | mdocsv |
| NEW USER: | | SEND |

| INFORMATION REGARDING HOST B | | INFORMATION REGARDING HOST C | | INFORMATION REGARDING HOST D | |
|---|---|---|---|---|---|
| 1 | FALSE | 1 | FALSE | 1 | FALSE |
| f3 | f4 | f3 | f4 | f3 | f4 |

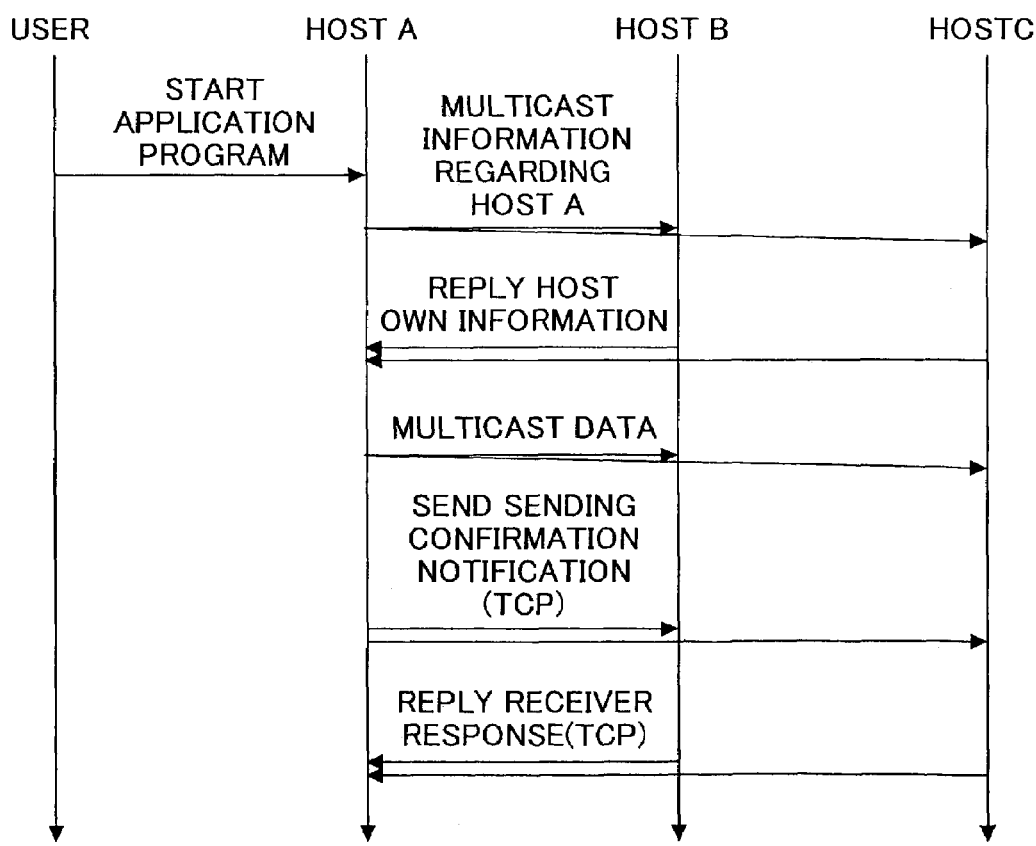

FIG.36

| HOST B | 1 | DATA |
| --- | --- | --- |
| HOST A | 1 | DATA |
| HOST A | 2 | DATA |
| HOST A | 3 | DATA |

DATA COMMUNICATION METHOD, SYSTEM AND PROGRAM USING UNICAST AND MULTICAST COMMUNICATIONS

BACKGROUND OF THE INVENTION

1. Field of the Invention

The present invention generally relates to a data communication method, a data communication system, a data communication program and a recording medium.

2. Description of the Related Art

Recently, the enrichment of communication functions provided to an information terminal and the development of communication networks have motivated to propose a variety of network applications (services). The network applications are typically classified as follows;

(1) Offering asynchronous one-to-one communication in principle such as e-mail systems.
(2) Obtaining information through free access of a large number of clients to a server such as a visit to Internet web sites.
(3) Offering simultaneous communication among several people in principle such as on-line chat systems, teleconference systems, and shared whiteboard systems.

At present, the mainstream of the network applications aims at the service types (1) and (2). In order to use such a network application for performing the service types (1) and (2) to communicate information, it is indispensable to prepare for a dedicated server. For instance, the e-mail systems require a server for sending and receiving information (mail server). Also, in order to provide the Internet web site service, it is necessary to prepare for a server for receiving accesses to the contents therein from unspecified hosts (Web server). When such a dedicated server is used, it is required to not only buy the server but also shoulder some additional expenses: for instance, the expense to set up, the expense to manage the server, and the expense to employ an administrator for the server. Thus, it is recently desired to develop a communication system and method capable of communicating information with no use of any dedicated server.

On the other hand, concerning such network applications for offering simultaneous communication among a large number of people (a large number of hosts) classified as the service type (3), it seems that the network applications other than on-line chat systems where text-based information is communicated are not so widely used. However, computer-based communication is expected to enter the broadband age in future. As a result, there would arise the stronger demand for a multimedia online-chat application having multimedia functions and a multimedia application such as teleconference systems. In future, it is expected to popularize the use of a network application offering simultaneous communication among a large number of people (hosts) classified as the service type (3).

Meanwhile, it is indispensable to provide a network application with communication functions such as "multicast" and "broadcast". In the multicast communication, one host can communicate with a plurality of specified hosts. On the other hand, in the broadcast, one host can communicate with all unspecified clients. Under the multicast and the broadcast, if a host sends a packet to a network address, which is designated for each of the multicast and the broadcast, (multicast address and broadcast address) only one time, a host can simultaneously send the packet to desired hosts connected to the host via a network. For that reason, the multicast function and the broadcast function work in favor of the processing efficiency and the band utility ratio of the network.

For instance, by using an educational information system, a teacher can send information to hosts of students in the class. Also, by using a conference information system, a speaker can send information to hosts of participants in the conference. These systems often utilize the multicast function and the broadcast function mentioned above. In contrast, under a one-to-one communication function such as a unicast function, for instance, if there are ten hosts where data should be sent, it is necessary to perform an operation to send the data ten times. Thus, the multicast function and the broadcast function can be used to avoid an unnecessary operation and improve the utilization efficiency of the network band. In the above-mentioned cases, it is preferable to use the multicast and the broadcast that can complete the process to send the same data to a plurality of hosts by operating only one time.

From the viewpoint of the property of the multicast communication, that is, identical data are sent to a plurality of specified hosts, the multicast communication adopts UDP (User Datagram Protocol) as a protocol for the transport layer in a communication network. In the connectionless type of protocol UDP, when a receiver host cannot receive data because of disconnection of the receiver host to the network, no response is replied for a confirmation request from the sender of the data. Consequently, the UDP has insufficient reliability in that even if a packet of the data is missed or packets of the data arrive in inappropriate order, the UDP accepts the data in the condition where the packets of the data are received without requesting to resend the missing packet and arranging the inappropriate order of the packets. On the other hand, since the UDP receives packets of the data without any care such as the resending request and the reordering process, the UDP is suitable for multimedia communication for audio data and video data that do not cause any serious trouble even if the above-mentioned problem occurs. Therefore, if the UDP is used as the transport layer protocol, another layer of the communication network, that is, the application layer has to be responsible to deal with the response confirmation.

Here, the typical transport protocol TCP (Transmission Control Protocol), which is a connection type protocol, is used for the one-to-one communication function such as the unicast. Unlike the UDP, the TCP can realize reliable communication in that the TCP can overcome the above-mentioned problem such as the lack of packet and the inappropriate packet arrival order. Consequently, the TCP is suitable for communication of a control signal and data. Under the TCP, however, when data are simultaneously sent to a plurality of hosts, it is necessary to establish connections whose number is equal to the number of the hosts and send the identical data repeatedly. As a result, the TCP incurs increasing unnecessary processes in terms of processes executed by the hosts and the band efficiency of the network connected to the hosts.

Recently, various data communication methods have been proposed in order to compensate for the insufficient reliability of the multicast communication.

Japanese Laid-Open Patent Application No. 11-17713 discloses a multicast communication processing method. In this disclosure, a central control apparatus and a plurality of slaver apparatuses, which are connected to each other via a network, are prepared as an environment for the multicast communication method. The disclosed multicast communication processing method determines whether or not the number of slaver apparatuses that inform the central control apparatus that the slaver apparatuses have received messages from the central control apparatus coincide with the number of slaver apparatuses connected to the network.

Japanese Laid-Open Patent Application No. 11-161622 discloses a communication system. In this disclosure, a central server is prepared for the communication system and works for a communication link that-has high probability of information loss. When information is sent via the communication link, the central server provides a missing portion of information so that the entire information can be restored.

Japanese Laid-Open Patent Application No. 2000-22687 discloses a wide area monitoring system for improving the insufficient reliability of the multicast. In the wide area monitoring system, a prepared server is responsible to collect entire data and deliver the data periodically or at the time when an event arises.

As mentioned above, however, all these system are based on the use of a server.

In a conference system where a plurality of hosts are connected to each other and information is communicated among the hosts, it is more preferable to use a communication system that operates in a "peer-to-peer" fashion than a "client server" fashion for some reasons. First, the client server type communication system tends to be complicated. Second, the place where the conference is held is not restricted in the peer-to-peer type communication system, that is, the conference can be held even at the place where the communication system cannot be connected to any server. Third, some expenses such as the server installation cost, the administrator personnel cost, and the management cost can be neglected in the peer-to-peer type communication system.

SUMMARY OF THE INVENTION

It is a general object of the present invention to provide a data communication system, a data communication method, a data communication program and a recording medium in which the above-mentioned problems are eliminated.

A more specific object of the present invention is to provide a data communication system, a data communication method, a data communication program and a recording medium that can decrease an amount of network traffic by using the peer to peer type network where data are communicated without the mediation of a server and improve the reliability of the multicast communication.

In order to achieve the above-mentioned objects, there is provided according to one aspect of the present invention a data communication method for sending and receiving packet data among a plurality of computers connected each other via a network wherein each of the computers has a multicast sending part sending packet data to a certain group of the computers in a multicast form, a multicast receiving part receiving the packet data and a connection type data sending and receiving part sending and receiving data to and from a computer in the certain group in a one-to-one unicast form, the data communication method comprising: a communication establishment step of designating at least one computer of the computers and establishing a communication to the one computer in the one-to-one unicast form when data are sent among the computers; and a data communication step of communicating the data with the one computer to which the communication is established by the communication establishment step in either the multicast form or the unicast form.

According to the above-mentioned invention, when packet data are communicated among a plurality of computers connected each other via the network, a communication is established under the unicast connection. Then, the packet data are sent by selectively using the multicast communication and the unicast communication for at least one computer to which the communication is established. As a result, it is possible to reduce an amount of network traffic under the peer-to-peer network without intermediation of a server and improve the reliability of the multicast communication.

In the above-mentioned data communication method, the multicast sending part and the multicast receiving part may use UDP (User Datagram Protocol) as a transport layer protocol and the connection type data sending and receiving part may use TCP/IP (Transmission Control Protocol/Internet Protocol) as the transport layer protocol.

According to the above-mentioned invention, it is possible to implement the multicast sending part, the multicast receiving part and the connection type data sending and receiving part in software forms.

In the above-mentioned data communication method, the multicast sending part, the multicast receiving part and the connection type data sending and receiving part may be implemented by causing the computers to read a program of an operation program file in an encapsulated document in which a digital information file, which is a representation entity of the encapsulated document, a display information file for specifying a display condition of the representation entity, and the operation program file including the program to display the representation entity and perform various functions are encapsulated.

According to the above-mentioned invention, since a program for implementing the multicast sending part, the multicast receiving part and the connection type data sending and receiving part together with the digital information file and the display information file is encapsulated as a single document, it is possible to more easily deal with and manage the program, the digital information file and the display information file.

In the above-mentioned data communication method, the communication establishment step may contain a request signal sending step of using the multicast sending part of one computer of the computers to send a request packet which is the packet data for identifying a handshaking computer of the computers, a request signal receiving step of using the multicast receiving part of another computer of the computers to receive the request packet, and a connection confirmation step of using the connection type sending and receiving part of the another computer to confirm a connection between the another computer and the one computer that sends the request packet.

According to the above-mentioned invention, after the request packet for establishing the communication is sent to the certain computers in the multicast form, connections are established among the individual computers in the unicast form. As a result, it is possible to easily establish the connections among the certain computers.

In the above-mentioned data communication method, the request packet may contain attribution information regarding the one computer that sends the request packet and a process request ID for identifying a process request toward the another computer.

According to the above-mentioned invention, it is possible to inform the receiver computer of the request packet of various information items regarding the sender computer of the request packet.

In the above-mentioned data communication method, the attribution information regarding the one computer may contain at least a network address of the, one computer.

According to the above-mentioned invention, it is possible to certainly reply a predetermined response to the sender computer of the request packet.

In the above-mentioned data communication method, the request signal receiving step may contain a request packet sender saving step of saving contents of the request packet as request packet sender information in a storage part of the another computer that receives the request packet.

According to the above-mentioned invention, since the various information items regarding the sender computer of the request packet are saved, it is possible to perform various processes such as the confirmation process of determining whether or not data are sent based on the saved information items.

In the above-mentioned data communication method, the connection confirmation step may contain a communicating computer saving step of saving attribution information regarding the another computer to which connection is confirmed as communicating computer information in a storage part of the one computer that sends the request packet if the connection is confirmed.

According to the above-mentioned invention, since the attribution information regarding the computer to which the connection is established is saved as the communicating computer information, it is possible to perform various processes such as the confirmation process of receiving response and the designation process of a computer to which data are to be sent based on the saved communicating computer information.

In the above-mentioned data communication method, the attribution information regarding the another computer may contain at least a network address of the another computer.

According to the above-mentioned invention, it is possible to certainly send a predetermined request to the computer to which the connection is established.

In the above-mentioned data communication method, the data communication method may further comprise a communication established computer announcing step of announcing the communicating computer information saved in the storage part of the one computer that sends the request packet.

According to the above-mentioned invention, it is possible to grasp the computer to which the communication is not established by sending the request packet in the multicast form.

In the above-mentioned data communication method, the data communication method may further comprise a request signal resending step of using the connection type sending and receiving part of the one computer to resend the request packet to a computer of the computers to which connection is not confirmed in order to confirm the connection if the connection to the computer is not confirmed.

According to the above-mentioned invention, when the communication cannot be established by sending the request packet in the multicast form, the request packet is sent to the designated network address in the unicast communication. As a result, it is possible to attempt again to establish the communication to the computer being in the condition where the packet data do not arrive in the multicast communication.

In the above-mentioned data communication method, the data communication step may contain a data sending step of using the multicast sending part of the one computer to send the data to another computer to which communication is established, a data receiving step of using the multicast receiving part of the another computer to receive the data, and a data sending determination step of using the connection type data sending and receiving part of the one computer to determine whether or not the data are certainly sent to the another computer.

According to the above-mentioned invention, after the connection is established, data are communicated in the multicast form and then it is determined whether or not the data are certainly sent. As a result, it is possible to reduce an amount of network traffic when the data are sent and improve the reliability of the multicast communication.

In the above-mentioned data communication method, the data sending determination step may contain a sending notification sending step of using the connection type data sending and receiving part of the one computer to send a sending notification packet for notifying the another computer to which communication is established that data are sent, a sending notification receiving step of using the connection type data sending and receiving part of the another computer to receive the sending notification packet, a sending condition checking step of checking whether or not the data are certainly sent to the another computer based on the sending notification packet, a result sending step of using the connection type data sending and receiving part of the another computer to send a check result to the one computer if the sending condition check step determines that the data are not sent to the another computer, and a result receiving step of the connection type data sending and receiving part of the one computer to receive the check result sent.

According to the above-mentioned invention, when data are sent in the multicast form, the connection type data sending and receiving part sends the sending notification packet for informing to send the data to the computer to which the data are sent and then the sending condition checking step checks whether or not the data are certainly sent to the computer. If the data are determined not to be sent based on a check result, the check result is replied to the sender computer. As a result, it is possible to check whether or not the data arrive in the multicast form.

In the above-mentioned data communication method, the data communication method may further comprise a first data resending step of using the connection type data sending and receiving part of the one computer to resend data to another computer to which the data are determined not to be sent based on a determination result of the data sending determination step.

According to the above-mentioned invention, if a computer to which the data are determined not to be sent in the multicast form is found, the data are resent to the computer in the unicast form. As a result, it is possible to improve the reliability of the data communication.

In the above-mentioned data communication method, the data communication method may further comprise a second data resending step of using the multicast sending part of the one computer to resend data to another computer to which communication is established and to which the data are determined not to be sent based on a determination result of the data sending determination step.

According to the above-mentioned invention, if a computer to which the data are determined not to be sent in the multicast form is found, the data are resent to the computer in the unicast form. As a result, it is possible to improve the reliability of the data communication.

In the above-mentioned data communication method, the data communication method may further comprise a resending notification sending step of using the connection type data sending and receiving part of the one computer to send a sending notification packet for notifying the another computer to which communication is established that data are sent.

According to the above-mentioned invention, the unicast communication is used to notify the computer to which the communication is established that the data are resent in the multicast form. If the computer has already received the data, the computer can reject to receive the data. As a result, it is possible to eliminate the problem that the computer receives the same data repeatedly.

In the above-mentioned data communication method, the multicast sending part, the multicast receiving part and the connection type data sending and receiving part may be implemented by causing the computers to read a program of an operation program file in an encapsulated document in which a digital information file, which is a representation entity of the encapsulated document, a display information file for specifying a display condition of the representation entity, and the operation program file including the program to display the representation entity and perform various functions are encapsulated, wherein the communication establishment step may contain a request signal sending step of using the multicast sending part of one computer of the computers to send a request packet which is the packet data for identifying a handshaking computer of the computers, a request signal receiving step of using the multicast receiving part of another computer of the computers to receive the request packet, and a connection confirmation step of using the connection type sending and receiving part of the another computer to confirm a connection between the another computer and the one computer that sends the request packet, wherein the connection confirmation step may contain a communicating computer saving step of saving attribution information regarding the another computer to which connection is confirmed as communicating computer information in a storage part of the one computer that sends the request packet if the connection is confirmed, and wherein the communicating computer information that is saved in the storage part of the one computer at the communicating computer saving step may contain a document title included in the encapsulated document.

In the above-mentioned data communication method, the data communication method may further comprise a first certain computer data sending step of identifying another computer having the document title with reference to the communicating computer information and sending data to only the another computer identified.

According to the above-mentioned inventions, based on the communicating computer information that the individual computers maintains, it is possible to send the data to only the computer having the same document title.

In the above-mentioned data communication method, the data communication method may further comprise a second certain computer data sending step of identifying another computer with reference to the communicating computer information and sending data to the another computer identified.

According to the above-mentioned invention, based on the communicating computer information stored in the storage part of the computer, it is possible to send the data to the designated computer.

In the above-mentioned data communication method, the second certain computer data sending step may use the connection type data sending and receiving part to send the data to only the another computer identified.

According to the above-mentioned invention, it is possible to send the data to only computers belonging to the subgroup of the certain group of computers.

In the above-mentioned data communication method, the second certain computer data sending step may use the multicast sending part to send the data together with information indicating that the data are sent to the another computer identified.

According to the above-mentioned invention, even if the data are sent to computers in the certain group in the multicast form, it is possible to send the data to only computers belonging to the subgroup of the certain group of computers.

In the above-mentioned data communication method, the data communication method may further comprise a network condition determination step of determining whether or not the another computer is in a network path whose communication condition is unsatisfactory and a unsatisfactory condition data sending step of using the connection type data sending and receiving part of the one computer to send the data to the another computer if the network condition determination step determines that the another computer is in the network path whose communication condition is unsatisfactory.

According to the above-mentioned invention, it is possible to send the data to the computer being in the network path whose communication condition is unsatisfactory by using the more reliable unicast communication.

In the above-mentioned data communication method, the network condition determination step may determine whether or not the another computer is in the network path whose communication condition is unsatisfactory based on a determination result of the data sending determination step.

According to the above-mentioned invention, it is possible to determine whether or not the certain computer is in the network path whose communication condition is unsatisfactory.

In the above-mentioned data communication method, the data communication method may further comprise an encrypting step of encrypting the data that are sent and a decrypting step of decrypting the data encrypted that are received.

According to the above-mentioned invention, since the communicated data are encrypted, it is possible to implement more secure data communication.

In order to achieve the above-mentioned objects, there is provided according to another aspect of the present invention a data communication system for sending and receiving packet data, comprising: a plurality of computers connected each other via a network, each of the computers having a multicast sending part sending packet data to a certain group of the computers in a multicast form, a multicast receiving part receiving the packet data, and a connection type data sending and receiving part sending and receiving packet data to and from a computer in the certain group in a one-to-one unicast form; a communication establishment part designating at least one computer of the computers and establishing a communication to the one computer in the unicast form when data are sent among the computers; and a data communication part communicating the data with the one computer to which the communication is established by the communication establishment part in either the multicast form or the unicast form.

Additionally, there is provided according to another aspect of the present-invention a data communication program for implementing a data communication system comprising a plurality of computers, the data communication program causing one of the computers to execute: a multicast sending function sending packet data to a certain group of the computers in a multicast form; a multicast receiving function receiving the packet data; a connection type data sending and receiving function sending and receiving packet data to and from a computer in the certain group in a one-to-one unicast form; a communication establishment function designating at least one computer of the computers and establishing a communication to the one computer in the unicast form when data are sent among the computers; and a data communication function communicating the data with the one computer to which the communication is established by the communication establishment part in either the multicast form or the unicast form.

Additionally, there is provided according to another aspect of the present invention a computer readable recording medium for recording a data communication program for implementing a data communication system comprising a plurality of computers, the data communication program causing one of the computers to execute: a multicast sending function sending packet data to a certain group of the computers in a multicast form; a multicast receiving function receiving the packet data; a connection type data sending and receiving function sending and receiving packet data to and from a computer in the certain group in a one-to-one unicast form; a communication establishment function designating at least one computer of the computers and establishing a communication to the one computer in the unicast form when data are sent among the computers; and a data communication function communicating the data with the one computer to which the communication is established by the communication establishment part in either the multicast form or the unicast form.

According to the above-mentioned inventions, when packet data are communicated among a plurality of computers connected each other via the network, a communication is established under the unicast connection. Then, the packet data are sent by selectively using the multicast communication and the unicast communication for at least one computer to which the communication is established. As a result, it is possible to reduce an amount of network traffic under the peer-to-peer network without intermediation of a server and improve the reliability of the multicast communication.

Other objects, features and advantages of the present invention will become more apparent from the following detailed description when read in conjunction with the accompanying drawings.

BRIEF DESCRIPTION OF THE DRAWINGS

FIG. 5 is a schematic diagram illustrating a data structure of an extended program reference file;

FIG. 6 is a schematic diagram illustrating an encapsulated document described by using XML (eXtensible Markup Language);

FIG. 32 is a schematic diagram illustrating communicating computer information including public key information;

FIG. 33 is a diagram roughly illustrating a data communication sequence from when communication is established to when data are sent;

FIG. 36 is a schematic diagram illustrating data receiving information according to a second embodiment of the present invention.

DETAILED DESCRIPTION OF THE PREFERRED EMBODIMENTS

In the following, embodiments of the present invention will be described with reference to the accompanying drawings.

A description will now be given, with reference to FIG. 1 through FIG. 35, of the first embodiment of the present invention.

An encapsulated document is formed by encapsulating a digital information file, a display information file, an operation program file, and the like as a single document. In general, the encapsulated document has a data communication function in the operation program file. This data communication function in the encapsulated document is applied to a data communication method according to the first embodiment of the present invention.

Figure 1:
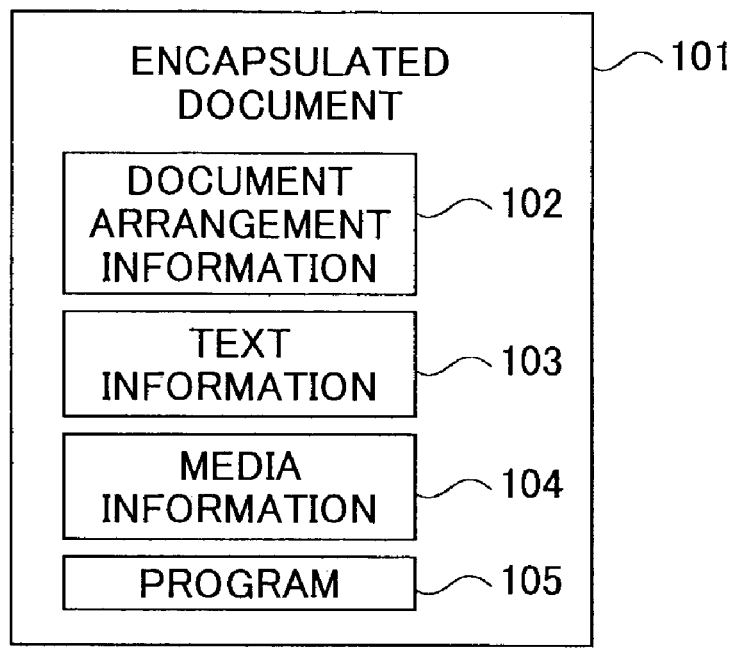
FIG. 1 is a schematic diagram illustrating a data structure of an encapsulated document according to a first embodiment of the present invention.

FIG. 1 is a schematic diagram illustrating a data structure of such an encapsulated document.

As is shown in FIG. 1, an encapsulated document 101 comprises document arrangement information 102 serving as a display information file for indicating a display condition such as an overall structure and arrangement of the encapsulated document 101, text information 103 serving as a digital information file for representing text contents in the encapsulated document 101, media information 104 serving as a digital information file for representing a still image or a moving image, and a program 105 being formed of a plurality of operation program files for displaying document contents of the encapsulated document 101 and detecting a manipulation of a user. These individual information items are formed as separated files that an operating system in an ordinary personal computer (hereinafter referred to as a computer) can manage.

Such an encapsulated document 101 can be stored in a variety of recording media: a magnetic recording medium such as a flexible disk, a hard disk, and a magnetic tape, a magnetic optical recording medium such as MO (Magneto Optical disk), an optical recording medium such as CD, CD-ROM, CD-R, CD-RW, DVD-ROM, DVD-R, DVD-RAM, DVD-RW, and DVD+RW, and a semiconductor memory. Some types of recording medium are movable and portable. Additionally, the encapsulated document 101 can be transmitted via various types of communication network such as LAN (Local Area Network) and the Internet.

Figure 2:
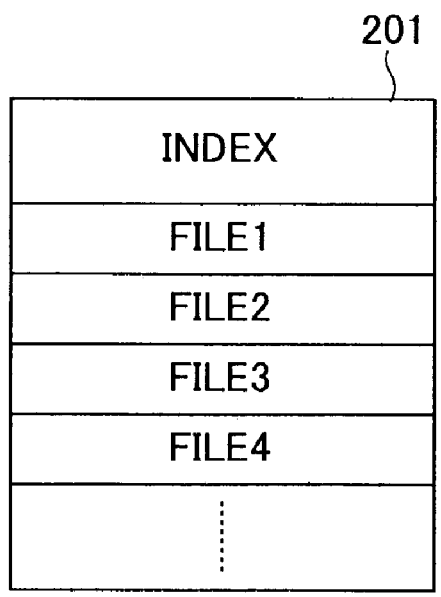
FIG. 2 is a schematic diagram illustrating a data structure of an archive file in which a plurality of files are encapsulated as the encapsulated document according to a first embodiment of the present invention.
Figure 3:
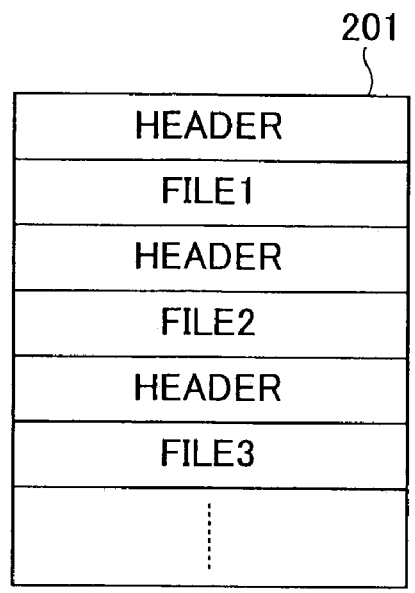
FIG. 3 is a schematic diagram illustrating another data structure of the archive file in which a plurality of files are encapsulated as the encapsulated document according to a first embodiment of the present invention.

FIG. 2 is a schematic diagram illustrating a data structure of an archive file. FIG. 3 is a schematic diagram illustrating another data structure of the archive file.

As is shown in FIG. 2 and FIG. 3, the individual files 102, 103, 104 and 105, which constitute the encapsulated document 101, are stored in an archive file 201. An encapsulating means for encapsulating the document arrangement information 102 (display information file), the text information 103 (text information file) and the media information 104 (digital information file) and the program 105 (operation program file) as a single document is provided in order to form the archive file 201. In order to form such an archive file, file formats such as ZIP and LHA are typically used. The archive file 201 may be formed by using these file formats.

The archive file 201 has a file structure for storing the files 102, 103, 104 and 105 as a single file. In the archive file 201, it is possible to handle the files 102, 103, 104 and 105 as the single file by means of an archive program having a storage function and a decompression function in accordance with a request of a user.

As is shown in FIG. 2, the archive file 201 has index information. The index information indicates where the individual files 102, 103, 104 and 105 are stored and serves to find storage positions of these files. As is shown in FIG. 3, header information may be attached to each of the files in the archive file 201 in order to find the storage position of the files instead of the index information.

As mentioned above, the encapsulated document 101 has the file structure in which the index information or the header information is used to manage a plurality of the files 102, 103, 104 and 105. Since these files 102, 103, 104 and 105 are encapsulated in the encapsulated document 101 as the single archive file 201, a user superficially can handle and maintain the files 102, 103, 104 and 105 as the single document.

Figure 4:
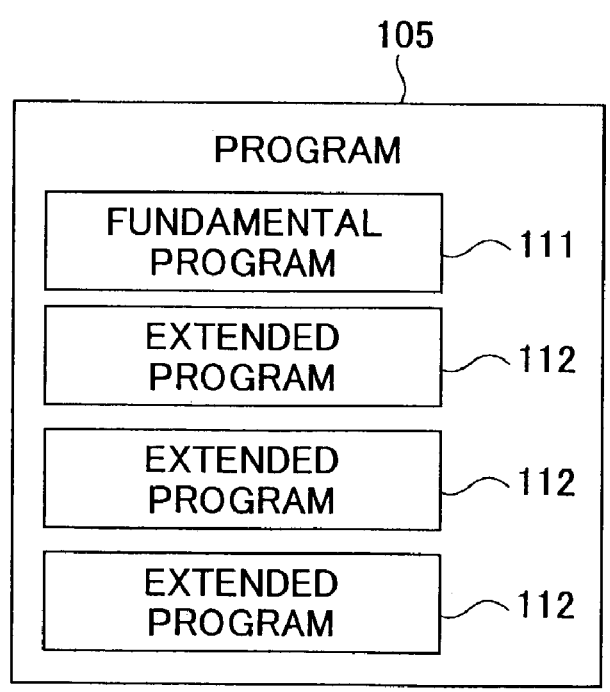
FIG. 4 is a schematic diagram illustrating a data structure of a program in the encapsulated document according to a first embodiment of the present invention.

FIG. 4 is a schematic diagram illustrating a data structure of the program 105 in the encapsulated document 101. FIG. 5 is a schematic diagram illustrating a data structure of an extended program reference file 113.

As is shown in FIG. 4, the program 105 is, formed of a plurality of operation program files. The program 105 comprises a fundamental program 111 and some extended programs 112.

When a user instructs a computer to start the encapsulated document 101, the fundamental program 111 of the encapsulated document 101 is automatically called. Every encapsulated document 101 has the fundamental program 111, which is formed uniquely to all encapsulated documents 101. When the user accesses the encapsulated document 101, the computer interprets and executes an initial program of the fundamental program 111, which is not illustrated in FIG. 4, and then the encapsulated document 101 is driven.

Some extended program 112 are added corresponding to information types in the encapsulated document 101. As is shown in FIG. 5, various extended programs 112 are prepared in accordance with types of display media. For instance, if the digital information file in the encapsulated document 101 comprises only the text information 103, "Text Panel" program 112*a* together with the fundamental program 111 is prepared as the extended program 112 in the encapsulated document 101. Also, if the digital information file comprises the media information 104 for representing a still image or a moving image, "Image Panel" program 112*b*, "Movie Panel" program 112*ac* and "3D Panel" program 112*d* are prepared as the extended program 112 in the encapsulated document 101.

FIG. 5 shows an example of an extended program reference file 113. The extended program reference file 113 is used to prescribe types of the extended program 112. The extended program reference file 113 also contains operations 114 and tags corresponding to the extended programs 112 in the encapsulated document 101. The extended program reference file 113 is stored as the program 105 in the encapsulated document 101.

A description will now be given, with reference to FIG. 6 and FIG. 7, of the document arrangement information 102. The document arrangement information 102 prescribes how the individual media in the encapsulated document 101 are displayed. Namely, the document arrangement information 102 has the display arrangement, the display size and the like regarding individual media in the encapsulated document 101. In the embodiments of the present invention, these information items are described in a generic XML form.

FIG. 6 is a schematic diagram illustrating an example of the encapsulated document 101 described by using the XML. In the XML, as is shown in FIG. 6, individual components are described by using a tag. Namely, a document is described in the XML as a collection of components. In this case, it is allowed to use a nesting structure in which a tag is inserted into another tag. Also, it is possible to provide an attribute to an individual tag.

Figure 7:
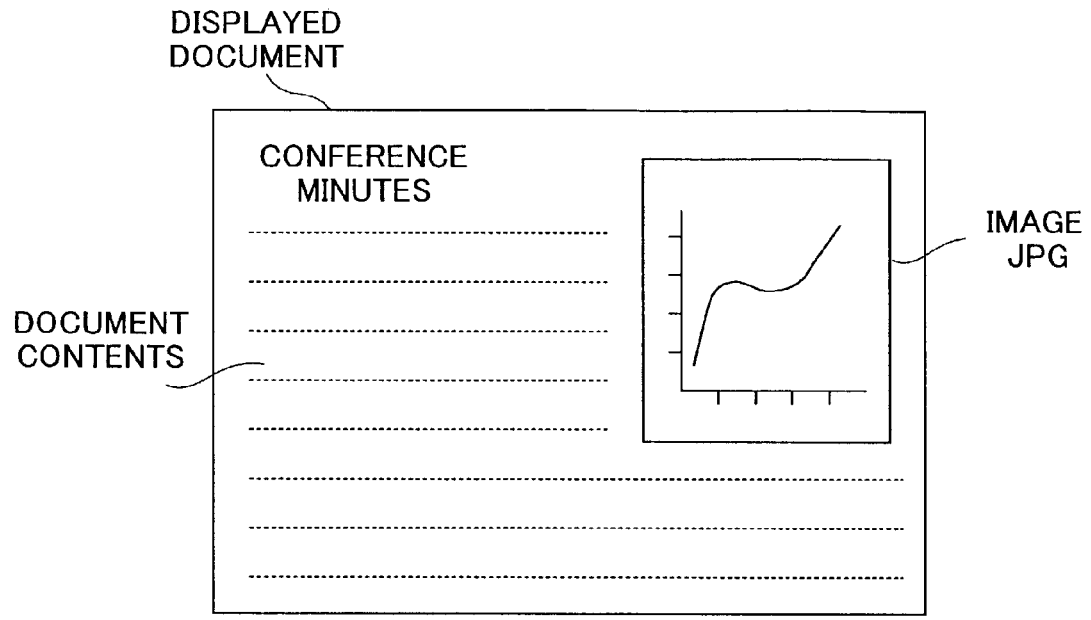
FIG. 7 is a display view of the encapsulated document in FIG. 6.

FIG. 7 is a view illustrating a display example of the encapsulated document 101 described by using the XML shown in FIG. 6. Tags <DOCUMENT> and </DOCUMENT> are placed at the head and the tail of a document. Information regarding the structure of the document is described between the two tags. Tags <TEXT> and <TEXT/> are used to display a document title at the top of the document. If only text information is described between the tags, that is, if there is no special attribute information between the tags, the text information is displayed as the plain text. The XML description in FIG. 6 has the tag <TEXT FILE="BODY.TEXT"/> at the next line. The tag is used to read the text file "BODY.TEXT" and display the contents thereof. Furthermore, the-image tag at the next line is used to read the still image file "IMAGE-.JPG" and display contents thereof at the position and the size prescribed by the image tag. Namely, the "X"-"Y" coordinate (100, 10) is set as the origin where the image should be displayed, and "WIDTH" and "HEIGHT" prescribe the size of the image to be displayed.

In the above-mentioned fashion, the document arrangement information 102 prescribes files to be displayed and the display arrangement thereof in the XML form.

Although this example focuses on the document arrangement information 102 described in the XML form, the document arrangement information 102 may be described in the other forms such as HTML form or some newly developed descriptive forms.

Also, the media information, which has a still image, a moving image, 3D image or audio information, may be created in a generic format or some newly developed format.

As mentioned above, the file structure of the encapsulated document 101 comprises the document arrangement information 102 for prescribing the display layout of a document to be displayed, a plurality of the media files such as a text information file (text information 103) and an image file (media information 104), and a plurality of programs 105.

A description will now be given of fundamental operations on the encapsulated document 101, that is, the operations from when a document is started to when the document is displayed.

Figure 8:
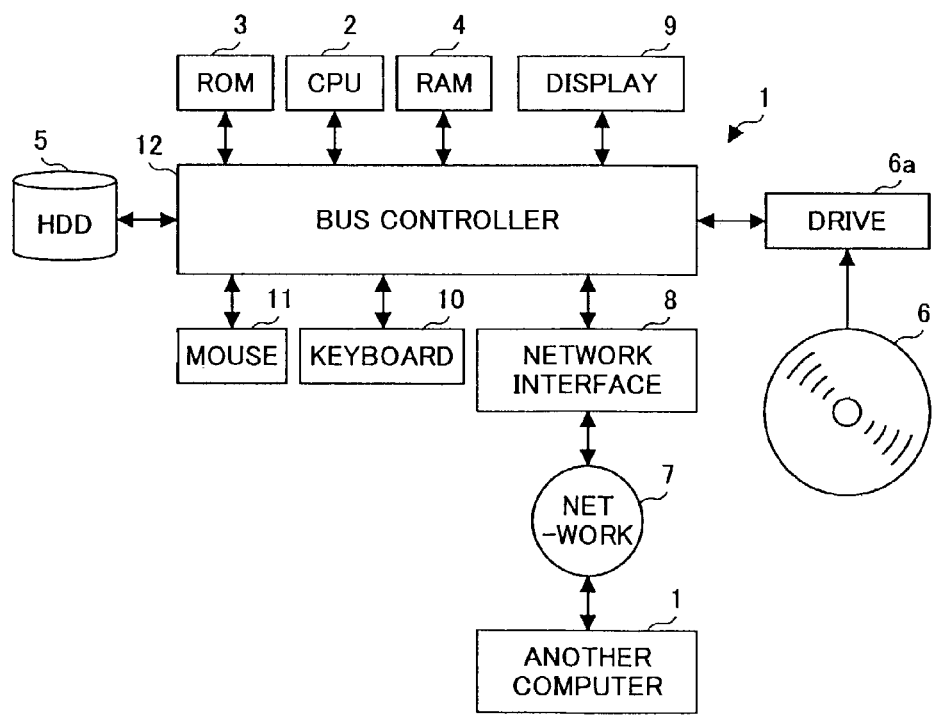
FIG. 8 is a block diagram illustrating a hardware configuration of a personal computer (computer)

FIG. 8 shows a hardware configuration of a computer 1. A computer 1 comprises a CPU (Central Processing Unit) 2 serving to process information, a ROM (Read Only Memory) 3 for storing some data such as BIOS (Basic Input Output System), a primary memory part such as a RAM (Random Access Memory) 4 for temporarily storing information during execution of the CPU 2, a secondary memory part such as a HDD (Hard Disk Drive) 5 for storing some data such as an execution result, a drive 6A of a removable media 6 such as a CD-ROM for storing/distributing information in/to an exterior of the computer 1 and obtaining information from an exterior of the computer 1, a network interface 8 for connecting to a network 7 so as to communicate with another computer 1 being in an exterior of the computer 1, a display 9 for displaying an execution progress and an execution result to a user, and an input apparatus such as a keyboard 10 and a mouse 11 through which the user inputs an instruction and information to the computer 1. A bus controller 12 serves to arrange a data communication among these parts.

Here, various recording media can be used as the removable medium 6: a magnetic recording medium such as a flexible disk, a hard disk, and a magnetic tape, a magnetic optical recording medium such as MO (Magneto Optical disk), an optical recording medium such as CD, CD-ROM, CD-R, CD-RW, DVD-ROM, DVD-R, DVD-RAM, DVD-RW, and DVD+RW, and a semiconductor memory.

When data are sent from the computer 1 to an exterior of the computer 1, the computer 1 sends the data to the network interface 8 and then the network interface 8 outputs the data to the network 7. When the network interface 8 receives data, it is determined in the network interface 8 whether or not the data should be fetched. If the data are determined to be fetched, the data are fetched in the computer 1. Otherwise, the data are discarded. As mentioned above, all data are sent or received via the network interface 8.

In general, when a user switches on such a computer 1, the CPU 2 starts a certain program, which is called a loader, in the BIOS stored in the ROM 3 and reads an operating system, which is a program for managing hardware and software of the computer 1, from the HDD 5 to the RAM 4. After starting, the operating system serves to read an application program, read and store information in accordance with a manipulation of the user. Windows (registered trademark of Microsoft Corporation) and UNIX (registered trademark of X/Open, Inc.) are typical operating systems. A program operated by these operating systems is usually called an application program.

Figure 9:
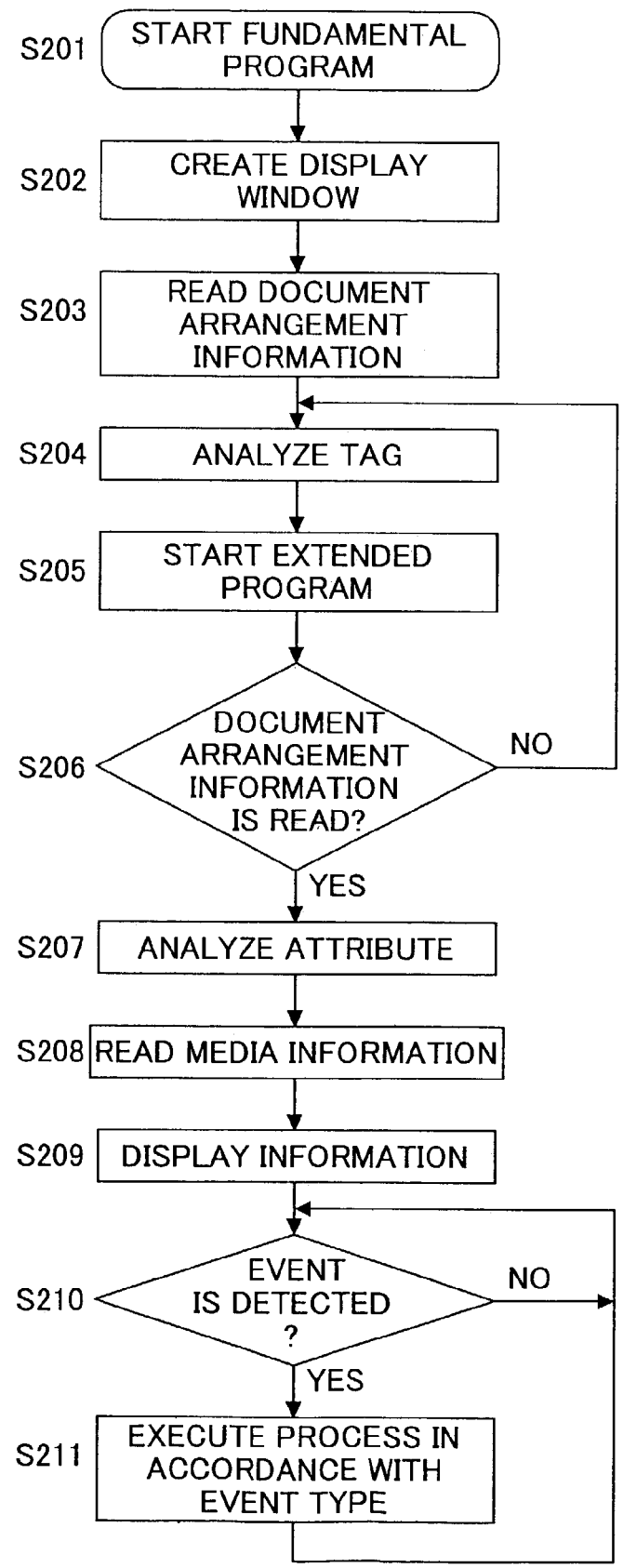
FIG. 9 is a flowchart of a procedure for displaying an encapsulated document by using a personal computer (computer)

FIG. 9 is a flowchart of a procedure for displaying the encapsulated document 101 by using the computer 1. In the embodiments of the present invention, such a computer 1 and such an encapsulated document 101 constitute an information processing apparatus.

The encapsulated document 101 contains an icon file related to icons, which are displayed on the display 9, based on data entity of the text information 103 and the media information 104. When the icons are displayed on the display 9 of the computer 1, a user can double-click the mouse 11 and the like on an icon corresponding to entity data of the encapsulated document 101 and start the fundamental program 111 that is stored as the archive file 201 in the encapsulated document 101 (step S201). Then, the fundamental program 111 creates a display window for displaying the document (step S202) and reads the document arrangement information 102 described as the XML form in the archive file 201 (step S203).

After reading the document arrangement information 102, the fundamental program 111 analyzes the tag structure of the document arrangement information 102 (step S204). Then, the fundamental program 111 starts an extended program 112 corresponding to a tag name described in the document arrangement information 102 in another thread of execution and then delivers attribution information described in the document arrangement information 102 to the extended program 112 (step S205). For every tag in the document arrangement information 102, the fundamental program 111 performs the above-mentioned process until completion of the process (step S206). As mentioned above, a plurality of extended programs 112 start in other threads for every tag in the document arrangement information 102 (step S205).

Each of the extended programs 112 analyzes the attribution information from the fundamental program 111 (step S207) and reads the text information 103 and the media information from the archive file 201 in the encapsulated document 101 in accordance with the attribution information (step S208). Then, the extended programs 112 display the text information 103 and the media information 104 in an area whose size corresponds to the attribution information within windows created by the fundamental program 111 (step S209). As a result, the encapsulated document 101 can display a plurality of items of the text information 103 and the media information 104 in the windows.

The text information 103 and the media information 104 are displayed on the display 9. After that, if the extended programs 112 detect an event (step S210: Y), the extended programs 112 perform a process in accordance with a type of the event (step S211). As a result, the encapsulated document 101 can display the document in the different fashion from a conventional document display method.

A description will now be given of how the program 105 is described in the encapsulated document 101.

The program 105 can be described by using a variety of descriptive methods.

As first descriptive method, the most popular language at present, C programming language is used to create the program 105. Then, the created program 105 is converted into the corresponding native code by C language compiler in the computer 1. Thereby, the CPU 2 can directly execute the code. In this case, the fundamental program 111 is formed as an executable file (XXX.EXE in Windows), and the individual extended program 112 is formed as a library file (XXX.DLL in Windows). The document arrangement information 102, the digital information file (text information 103 and media information 104) and the program 105 are searched for based on the index information and the header in the encapsulated document 101. The found program 105 is designated as the fundamental program 111. However, the first descriptive method does not seem excellent because the resulting native code depends on the type of the CPU 2.

As the second descriptive method, an interpreter language such as Java (registered trademark of Sun Microsystems, Inc.) is used to create the program 105. In this descriptive method, the program 105 is written in an intermediate code that is a higher level code than an executable code. At execution of the program 105, the intermediate code is converted into the native code understandable to the CPU 2, and then the CPU 2 executes the converted code. If the second descriptive method is used to write the program 105, it is possible to handle the encapsulated document 101 in the multi platform that does not depend on the type of the CPU 2.

As mentioned above, when a user accesses the encapsulated document 101 according to the embodiment of the present invention, the computer 1 starts the fundamental program 111. Then, the initial program in the fundamental program 111 reads some information items from the document arrangement information 102, and the corresponding extended program 112 is driven based on the document arrangement information 102.

Figures 10, 11:
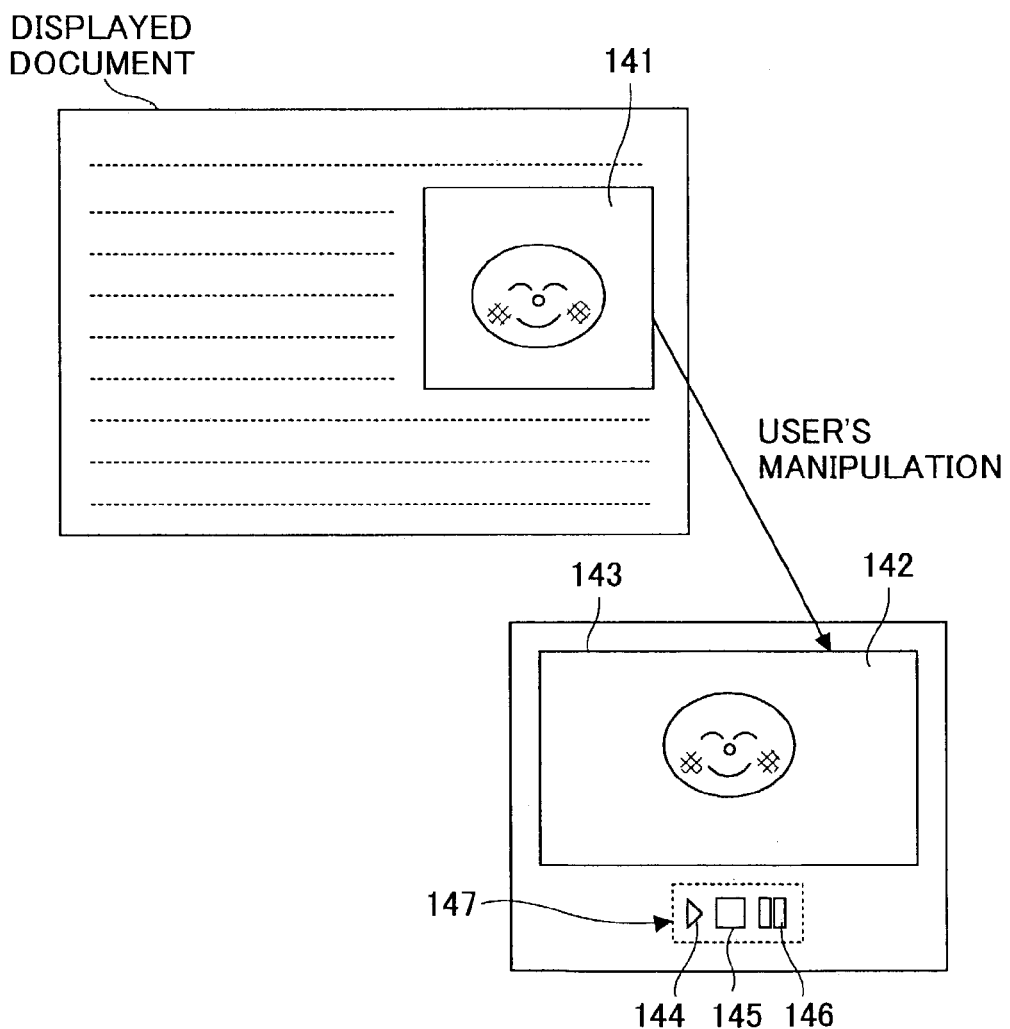
FIG. 10 is a schematic diagram illustrating a file structure of a file for prescribing a correspondence of types of media information with types of extended programs.
FIG. 11 is a schematic diagram illustrating a moving image reproduction function of an extended program and a function to display a flash image of the moving image.

As mentioned above, the fundamental program 111 may prepare a program as the extended program 112 in accordance with the tag types in the document arrangement information 102 described in the XML form and the like and drive the prepared extended program 112. Also, the fundamental program 111 may selectively prepare some programs as the extended programs 112 in accordance with the type of digital information file (text information 103 and media information 104) and drive these prepared extended programs 112. For instance, there are a plurality of typical moving image reproduction formats. As is shown in FIG. 10, if the fundamental program 111 prepares a program that can correspond to all the moving image reproduction formats as the single extended program 112, the prepared extended program 112 cannot help becoming a large size program. In order to avoid the problem, a plurality of small extended programs 112 are prepared rather than the single large program in accordance with the types of moving image reproduction formats as shown in FIG. 10. Then, some of the extended programs 112 are encapsulated corresponding to the moving image reproduction format suitable for the encapsulated document 101.

A detailed description will now be given of the extended program 112 by using some examples.

The first example handles a case where the encapsulated document 101 has a plurality of digital information files (the text information 103 and the media information 104). In this case, the extended program 112 displays a panel so that a user can select a file among the digital information files. A list of the digital information files in the encapsulated document 101 is displayed in the panel. As is shown in a flowchart in FIG. 9, when the user uses the mouse 11 and the like to select the file, the extended program 112 would detect an event caused by the user's selecting operation (step S210: Y) Then, the extended program 112 performs an operation corresponding to the event (step S211).

As this operation, the extended program 112 displays the selected digital information file on the display 9.

The second example handles a case where the encapsulated document 101 has a moving image file as a digital information file.

As is shown in FIG. 11, the extended program 112 displays a flash still image 141 formed of a frame of the moving image within a document on the display 9. As is shown in the flowchart in FIG. 9, when a user clicks the mouse 11 on a display area of the still image 141 in the document on the display 9, the extended program 112 would detect the event (step S210: Y). Then, the extended program 112 performs an operation corresponding to the event (step S211). As this operation, the extended program 112 displays a pop-up frame 143 including a still image 142 formed by varying the size of the still image 141 together with operation buttons comprising a reproduction button 144, a stop button 145 and a pause button 146. As is shown in the flowchart in FIG. 9, when a user selects one of these buttons 144, 145 and 146 by using the mouse 11 and the like, the extended program 112 would detect the event (step S210: Y). Then, the extended program 112 performs an operation corresponding to the event (step S211).

As the operation, if the reproduction button 144 is selected, the extended program 112 reproduces the underlying moving image of the still image 142. If the stop button 145 is selected, the extended program 112 stops reproducing the moving image. If the pause button 146 is selected, the extended program 112 displays a current flash still image of the moving image.

The third example handles a case where the encapsulated document 101 includes an audio information file as the media information 104.

Figure 12:
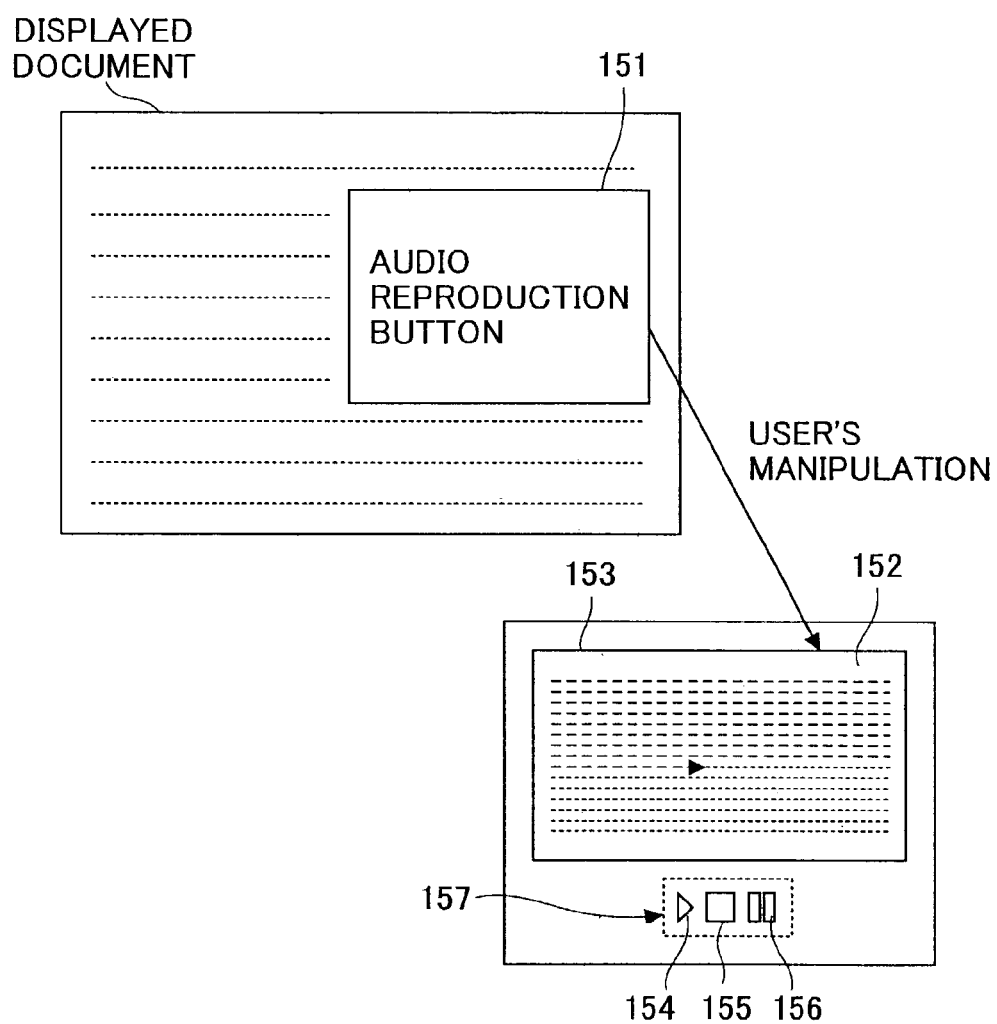
FIG. 12 is a schematic diagram illustrating an audio reproduction function of an extended program and a function to create text information from the reproduced audio information.

As is shown in FIG. 12, the extended program 112 displays an audio reproduction button 151, which serves as a function panel and a reproduction panel, in a document on the display 9. As is shown in the flowchart in FIG. 9, when a user clicks the mouse 11 on a display area of the audio reproduction button 151 in the document on the display 9, the extended program 112 would detect the event (step S210: Y). Then, the extended program 112 performs an operation corresponding to the event (step S211).

As this operation, the extended program 112 displays a pop-up frame 153 including an audio-to-text display area 152 to be mentioned later. The extended program 112 displays operation buttons 157 comprising a reproduction button 154, a stop button 155 and a pause button 156 on the pop-up frame 153. As is shown in the flowchart in FIG. 9, when a user clicks the mouse 11 on one of these buttons 154, 155 and 156, the extended program 112 would detect the event (step S210: Y).

Then, the extended program 112 performs an operation corresponding to the event (step S211).

As this operation, if the reproduction button 154 is selected, the extended program 112 reproduces the audio information in the encapsulated document 101. If the stop button 155 is selected, the extended program 112 stops reproducing the audio information. If the pause button 156 is selected, the extended program 112 temporarily pauses the reproduction of the audio information at this point.

Furthermore, the extended program 112 has an additional function. When the reproduction button 154 is selected and the audio information is reproduced, the extended program 112 causes the computer 1 to exercise the audio-to-text function of displaying visualized text information in which the reproduced audio information is visualized as the text information thereof on the audio-to-text display area 152. This function is useful when a sound function for outputting the audio information is OFF or when the document is displayed to the hard of hearing. Also, the audio-to-text function may be automatically exercised if the audio-to-text function is set to the computer 1 in advance for the handicapped.

In these cases, the audio information file may have a data structure specified for audio data, that is, the audio information is formed by sampling the underlying audio. Also, the audio information file may be formed of text data. If the audio information file is formed of text data, it is possible to reproduce the audio information by using an audio synthesizer LSI and so on to convert the text data into audio data based on characteristics of the audio. Additionally, if the audio information file- is formed of text data, it is possible to directly use the text data of the audio information file for the audio-to-text operation without any conversion. In contrast, if the audio information file is formed of audio data, it is necessary to analyze the audio data and perform the audio-to-text operation for the analyzed audio data.

As mentioned above, it is possible to provide a variety of extended programs 112 to the encapsulated document 101 in accordance with the various characteristics of the digital information to be displayed or reproduced. If these extended programs 112 are prepared as parts for a multimedia document, it is possible to realize the extended program 112 that can flexibly correspond to various types of media. In this case, it is sufficient to provide only necessary extended programs 112 to the encapsulated document 101. Accordingly, the encapsulated document 101 can be handled in a compact form.

Figure 13:
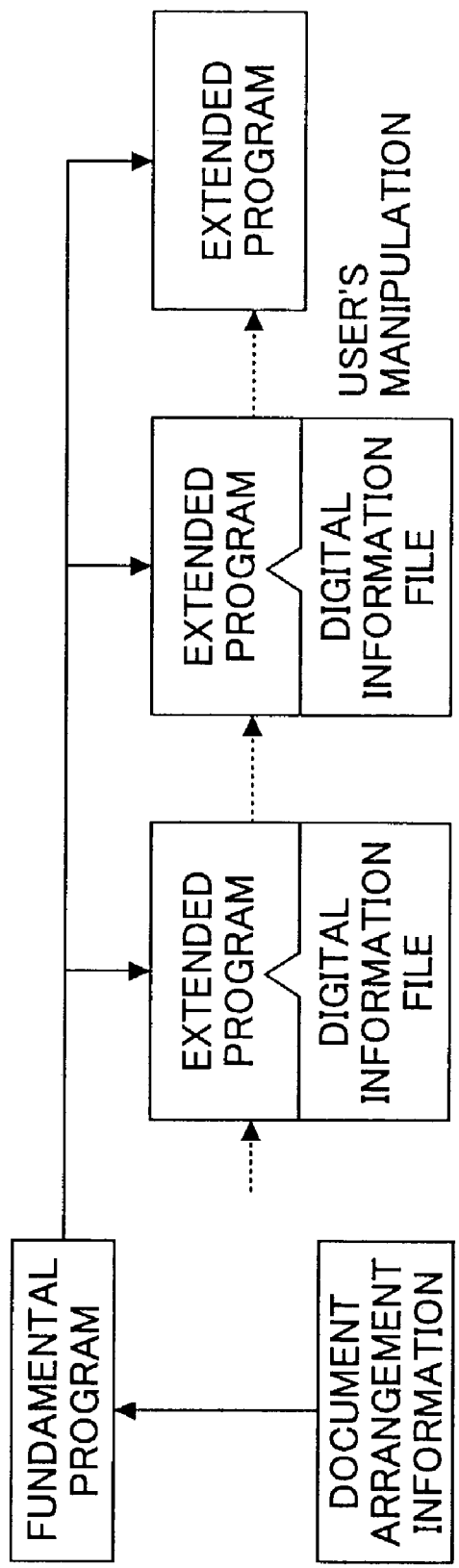
FIG. 13 is a schematic diagram illustrating a structure of an extended program included in an encapsulated document.

FIG. 13 shows a structure of the extended program 112 in the encapsulated document 101. In the encapsulated document 101 according to the first embodiment, the fundamental program 111 reads the document arrangement information 102, and the extended program 112 corresponding to the digital information file (text information 103 and media information 104) is started with reference to the document arrangement information 102. The extended program 112 displays or reproduces the digital information file. Also, individual extended programs 112 detect a user's manipulation and perform operations corresponding to the user's manipulation. If an extended program 112 operates without necessity of the reference to any digital information file, the extended program 112 simply accepts a user's manipulation and performs an operation corresponding to the user's manipulation.

Figure 14:
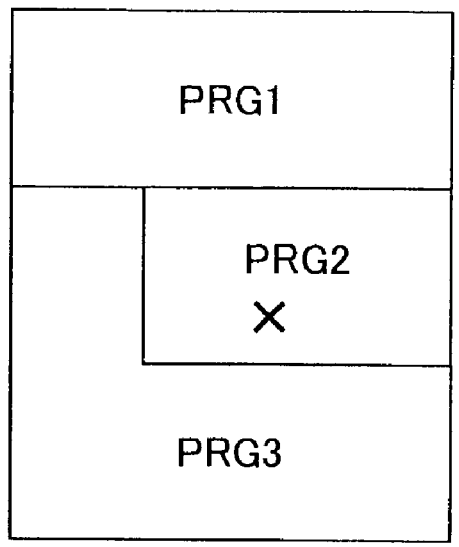
FIG. 14 is a schematic diagram illustrating a display view showing three types of digital information: PRG 1, PRG 2 and PRG 3.

There are various user's manipulations such as clicking of the mouse 11 and an input through the keyboard 10. In the clicking of the mouse 11, an individual extended program 112 determines whether or not a position where the mouse 11 is clicked is within a display area occupied by the extended program 112 and then performs an operation corresponding to the clicking an the display area if the clicked position is in the occupied area. In the input through the keyboard 10, an individual extended program 112 determines whether or not a cursor position of the keyboard 10, which is not illustrated, is within a display area occupied by the extended program 112 and then performs an operation corresponding to the cursor position if the cursor position is in the occupied area. As is shown in FIG. 14, for instance, when three types of digital information PRG 1, PRG 2 and PRG 3 are displayed in a document and a user clicks the mouse 11 on the position designated by the sign "X", the extended program PRG 2 corresponding to the position detects the clicking of the mouse 11 and performs an operation corresponding to the clicking.

In this fashion, the document form of the encapsulated document 101 according to the first embodiment comprises a collection of extended programs 112 related to types of media and types of tags for display information files. Here, the minimal document form comprises only just the fundamental program 111 and the document arrangement information 102. A digital information file (text information 103 and media information 104) is encapsulated in the encapsulated document 101 in accordance with information that a user wants to store therein. In order to display or reproduce the encapsulated information, an extended program 112 is added to the encapsulated document 101. The encapsulated document 101 maintains the above-mentioned files as a single file by using an archive form.

A description will now be given of a communication function of an extended program 112.

This communication function is used to communicate between encapsulated documents 101 driven in at least two computers 1 connected to each other via the network 7.

Although the communication between the encapsulated documents 101 will be mentioned here, the encapsulated documents 101 are not always required to implement the communication function. From the viewpoint of addition of the function to the extended program 112, it is more useful to implement the communication function by using the encapsulated documents 101.

In the first embodiment, the communication function is added to the encapsulated document 101 as mentioned above. In this case, the XML tag <COM/> is used to designate the communication function. For instance, when the fundamental program 111 reads this tag, the fundamental program 111 starts an extended program 112 having the communication function. Then, the extended program 112 displays a communication button, which is not illustrated, in the encapsulated document 101 on the display 9.

Figure 15:
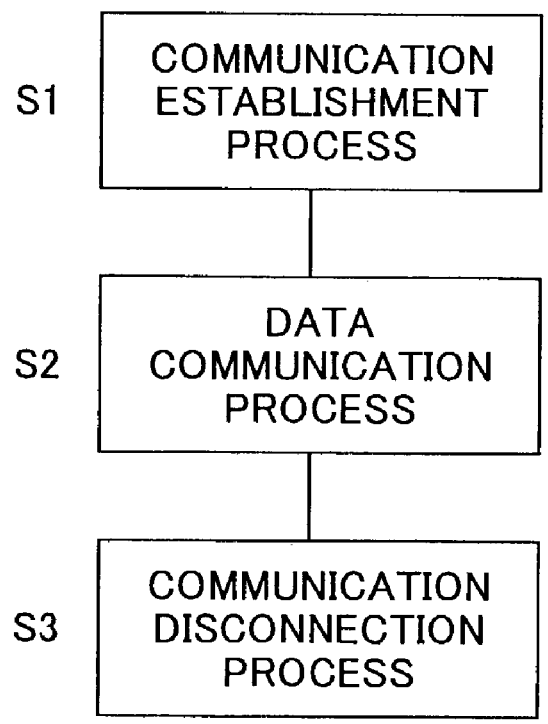
FIG. 15 is a flowchart of a communication procedure of a communication function performed by an encapsulated document.

FIG. 15 is a flowchart of a process performed by the communication function of the encapsulated document 101. As is shown in FIG. 15, the extended program 112 having the communication function performs as follows: a process for establishing communications to other computers. 1 (step S1), a process for communicating data between the computers 1 after the establishment of the communication (step S2), and a process for disconnecting between the computers 1 after completion of the data communication (step S3).

Figure 16:
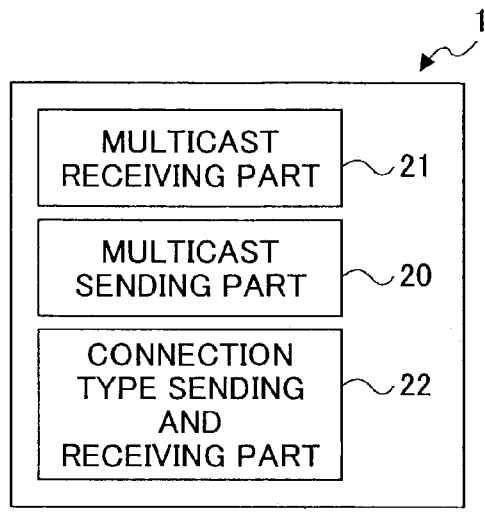
FIG. 16 is a block diagram illustrating various means related to the communication function performed by an encapsulated document.

As is shown in FIG. 16, the computer 1 has a multicast sending part 20, a multicast receiving part 21, and a connection type sending and receiving part 22 under the communication method according to the first embodiment.

The multicast sending part 20 serves to send a message in a multicast, that is, the message is sent from one host to a plurality of specified hosts. Then, the multicast packet is sent to a predetermined multicast address. The multicast receiving part 21 belongs to the predetermined group of specified hosts to which the multicast packet is sent based on the multicast address. When the multicast receiving part 21 receives a multicast packet, the multicast receiving part 21 examines the multicast packet. If the multicast packet is sent to the group to which the multicast receiving part 21 belongs, the multicast receiving part 21 delivers the multicast packet to an application program driven in the computer 1 of the multicast receiving part 21. The multicast sending part 20 and. the multicast receiving part 21 use UDP (User Datagram Protocol) as a transport layer protocol.

On the other hand, the connection type sending and receiving part 22 performs a unicast communication, that is, a one-to-one communication. In order to send and receive data, the connection type sending and receiving part 22 establishes a one-to-one connection to another computer 1. The connection type sending and receiving part 22 uses TCP (Transmission Control Protocol) as a transport layer protocol. Namely, the communication under the connection type sending and receiving part 22 follows TCP/IP (Transmission Control Protocol/Internet Protocol).

It is possible to implement the multicast sending part 20, the multicast receiving part 21 and the Connection type sending and receiving part 22 in the software level.

For instance, the Java has API (Applications Programming Interface) for sending and receiving data. In detail, the Java has the API "ServerSocket" for receiving a request as a receiver socket and the API "Socket" for establishing a connection. For a connection request received via the network interface 8, the "ServerSocket" uses the method "accept( )" to accept the connection request. Then, the connection between two computers 1 in question is established via the network interfaces 8 of the computers 1 by using the API "Socket". As a result, it becomes possible for the computers 1 to accept data. Here, if the API "Socket" is not opened, data are not communicated (the message "Socket error" is returned.). Thus, in the Java, the connection type sending and receiving part 22 can be easily implemented by using methods "getOutputStream( )" and "getInputStream( )" of the APIs "ServerSocket" and "Socket".

Also, the Java has the APIs "DatagramSocket" or "MulticastSocket" ("MulticastSocket" is inherited from "DatagramSocket".) corresponding to the UDP for the multicast. The APIs "DatagramSocket" and "MulticastSocket" have a method "send ( )", and the method "send( )" can send data via the network interface 8 regardless of the condition of a receiver computer. Thus, in the Java, the multicast sending part 20 can be easily implemented by using the method "send ( )" of the API "MulticastSocket" ("DatagramSocket"), and the multicast receiving part 21 can be easily implemented by using a method "receive( )" of the API "MulticastSocket" ("DatagramSocket").

Thus, it is possible to incorporate programs for implementing the multicast sending part 20, the multicast receiving part 21 and the connection type sending and receiving part 22 into the extended program 112.

Figure 17:
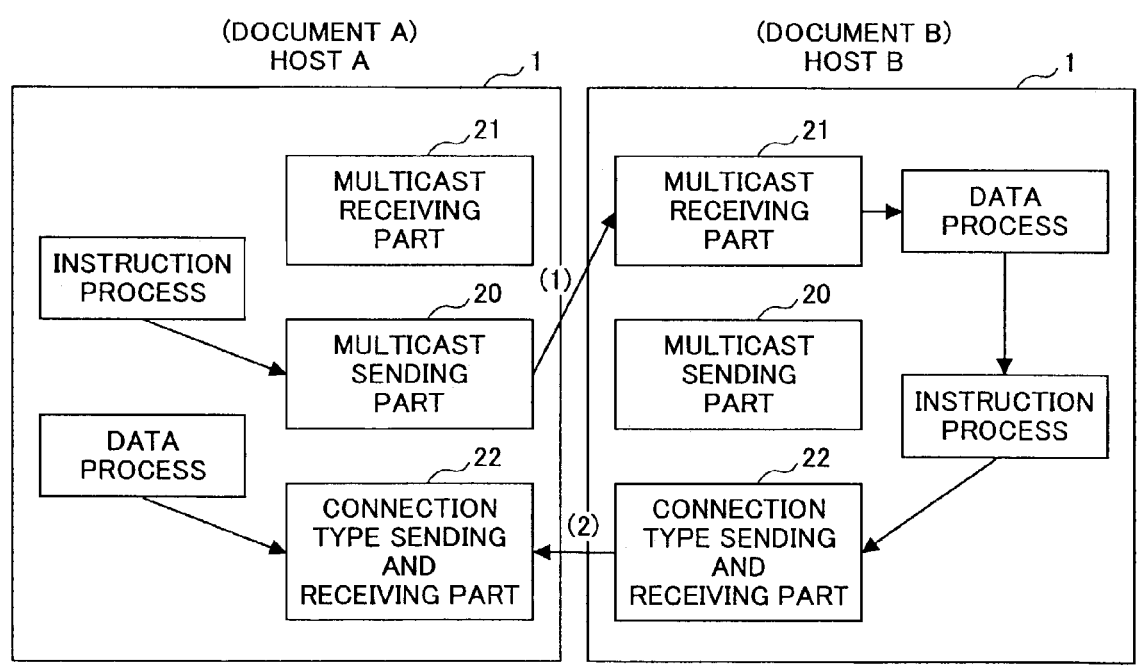
FIG. 17 is a flowchart of a procedure for establishing a communication between encapsulated documents of one to one computers.

A description will now be given, with reference to FIG. 17, of the process for establishing a communication between two encapsulated documents 101 of computers 1 in the one-to-one communication form. Here, for convenience, the two encapsulated documents 101 are called documents A and B corresponding to hosts A and B for the computers 1, respectively.

Regarding the document A driven in the host A, when the extended program 112 of the document A detects that a user of the host A clicks the mouse 11 and the like on a communication button displayed in the document A, a packet sending instruction is issued (instruction process). Then, the extended program 112 uses the multicast sending part 20 to send a request packet (FIG. 17 (1)).

In the host B, when the multicast receiving part 21 of the document B receives the request packet, the request packet is provided to the document B and then is analyzed in the host B (data process). Then, the document B in the host B stores and maintains content information of the request packet in the RAM 4 or the HDD 5 of the host B, and if it is necessary to connect between the hosts A and B based on the analysis result, the document B uses the connection type sending and receiving part 22 of the document B to issue an instruction to establish the connection between the hosts A and B (instruction process). The connection type sending and receiving part 22 establishes the connection to the host A in accordance with the connection establishment instruction and replies a receiver response packet to the host A (FIG. 17 (2)).

When the host A receives the receiver response packet through the connection type sending and receiving part 22 of the document A, the receiver response packet is delivered to the document A and then is analyzed in the host A (data process). When content information of the receiver response packet is stored and maintained in the RAM 4 or the HDD 5 of the host A, it is concluded that the communication of these packets has been properly completed. Consequently, the communication between the hosts A and B has been established.

Figure 18:
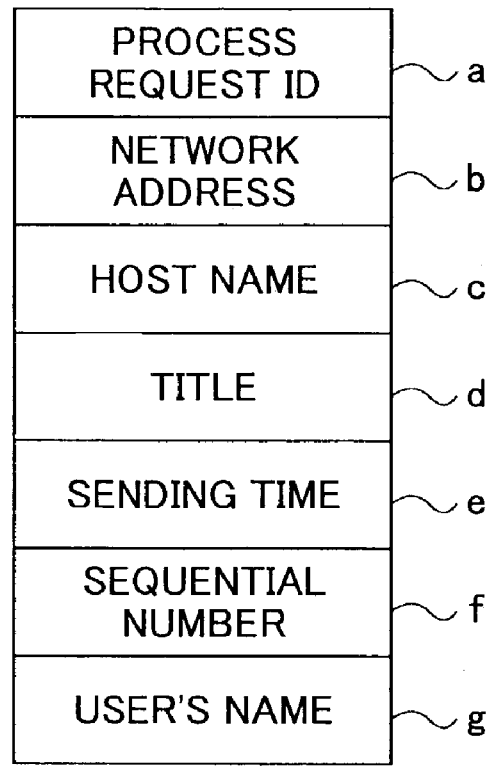
FIG. 18 is a schematic diagram illustrating contents of a request packet and a receiving response packet.

FIG. 18 shows an example of contents of the request packet and the receiver response packet. In this example, the request packet and the receiver response packet comprise a process request ID a, a network address (IP address) b, a host name c, a title d, sending time e, a sequential number f, and a user's name g. The process request ID is prescribed in advance and is used to identify a content type of the packet. For instance, the process request ID of a request packet represents packet contents such as "a request to send a receiver response packet". The multicast receiving part 21 or the connection type sending and receiving part 22 reads the process request ID and then issues a process instruction corresponding to the process request ID.

The network address and the host name are a network address and a host name of a sender of the packet (host A in FIG. 17), respectively. The title is a file name in the document in question or a document title. The sending time is time when the packet is sent. The sequential number is attached when the packet is sent in the multicast. For instance, the sequential number has "2" if the packet has been multicast two times.

Figure 19A:
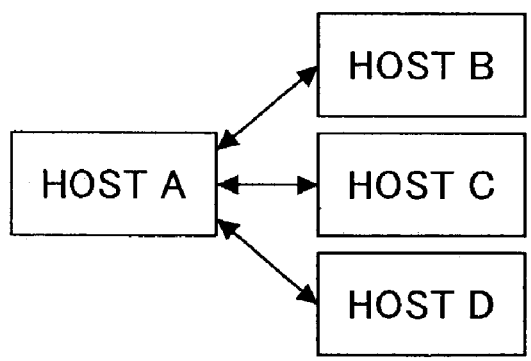
FIGS. 19A and 19B are schematic diagrams illustrating two types of communication establishment among four computers.
Figure 19B:
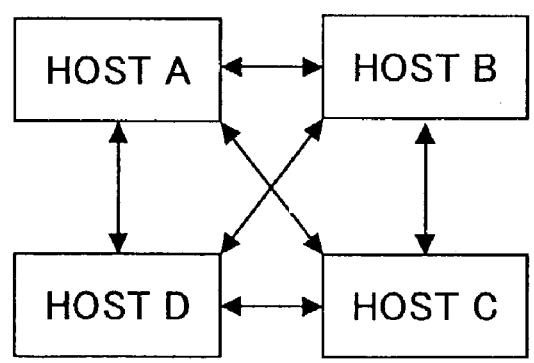

The above description is related to how the communication between two computers 1, that is, the one-to-one communication, is established. However, in fact, it is necessary to consider the case where connections among at least three computers 1 are established. FIGS. 19A and 19B show two cases where connections among four computers 1, that is, hosts A through D, are established.

When the host A is connected to the other hosts: the host B, the host C and the host D, a request packet is sent from the multicast sending part 20 of the host A to the host B, the host C and the host D.

When the multicast receiving parts 21 of the host B, the host C and the host D receive the request packet, these hosts deliver content information of the request packet to the document B, the document C and the document D, respectively. Then, the content information is stored and maintained in the RAMs 4 or the HDDs 5 of the hosts. Then, the host B, the host C and the host D attempt to use the connection type sending and receiving parts 22 thereof to establish connections to the connection type sending and receiving part 22 of the host A.

After the connections are established, the host B, the host C and the host D separately send receiver response packets to the host A.

Figure 20:
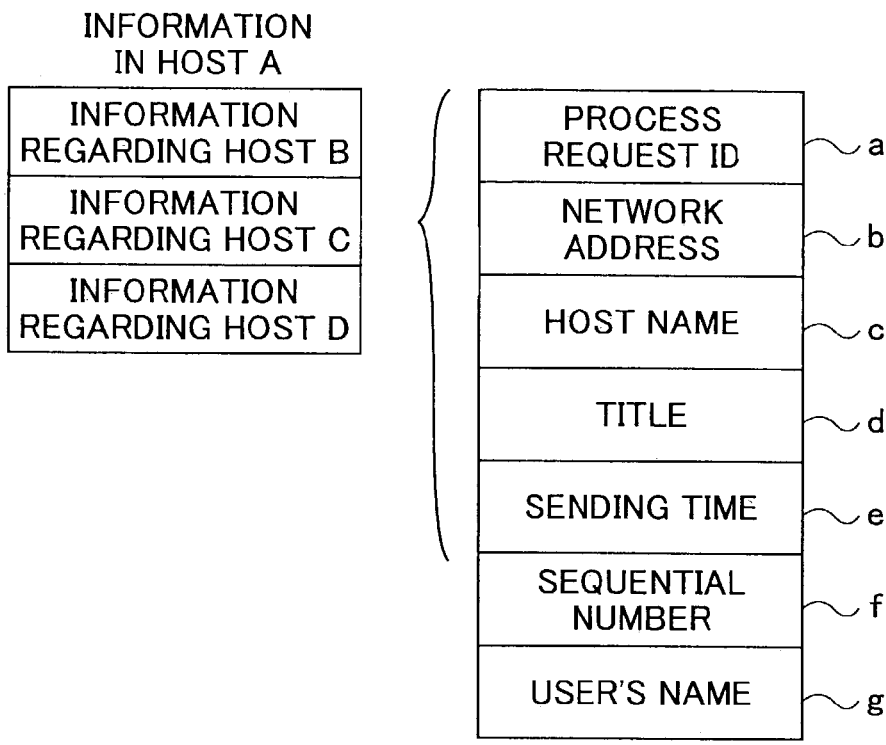
FIG. 20 is a schematic diagram illustrating information maintained in a host.

After the host A receives the receiver response packets in the connection type sending and receiving part 22 of the host A, the host A delivers content information of the receiver response packets to the document A and then the content information is stored and maintained in the RAM 4 or the HDD 5 of the host A. FIG. 20 is a schematic diagram illustrating the content information stored and maintained in the RAM 4 or the HDD 5 of the host A. As is shown in FIG. 20, three pieces of the content information regarding the host B, the host C and the host D are stored and maintained in the RAM 4 or the HDD 5 of the host A. On the other hand, although not illustrated, the content information regarding the host A is stored and maintained in the RAMs 4 or the HDDs 5 of the host B, the host C and the host D.

In the above-mentioned process, the connections: the hosts A-B, the hosts A-C and the hosts A-D as shown in FIG. 19A, have been established.

Similarly, if the host B, the host C and the host D send multicast packets, it is possible to establish the other communications regarding the hosts B-C, the hosts B-D and the hosts C-D. In this fashion, as is shown in FIG. 19B, every of the four hosts could establish the communications to the other hosts.

In the above-mentioned communication establishment method, it is supposed that the multicast sending part 20 is used to send a request packet as a multicast packet. However, since the multicast sending part 20 uses the UDP as the transport layer protocol, the multicast packet is accepted without any consideration even if a portion of the multicast packet is lost or components of the multicast packet do not arrive in the appropriate order. As a result, the communication is likely to have insufficient reliability. Namely, there arises a problem in that when a request packet is not properly delivered to an intended host, it is impossible to establish a communication to the host. In order to overcome the problem, a communication establishment confirmation process, which will be mentioned later, is performed in parallel with the above-mentioned communication establishment process in the data communication method according to the first embodiment.

Figure 21:
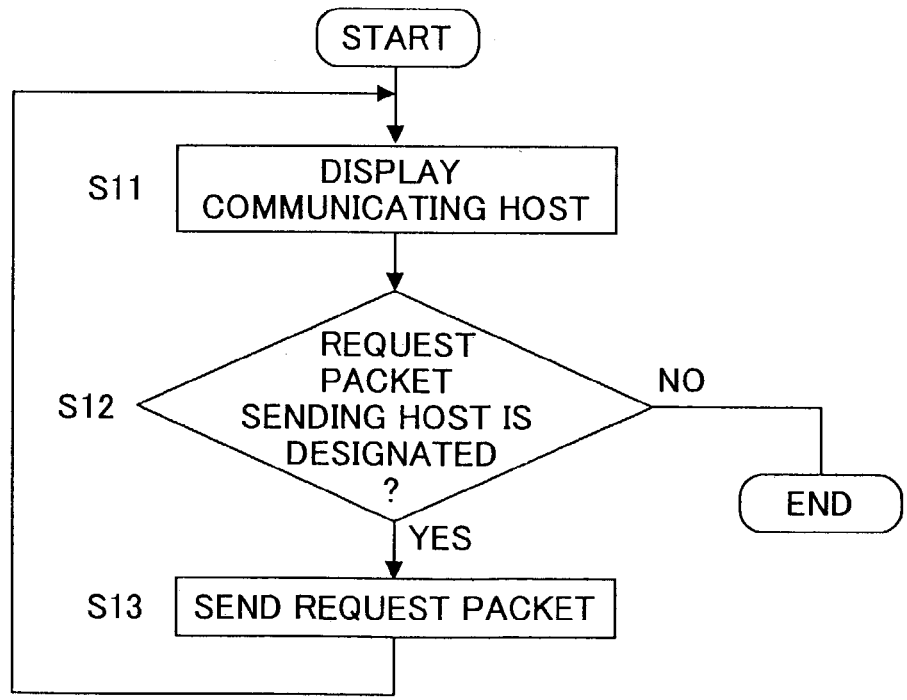
FIG. 21 is a flowchart of a procedure for determining whether or not a communication is established.
Figures 22, 23, 24:
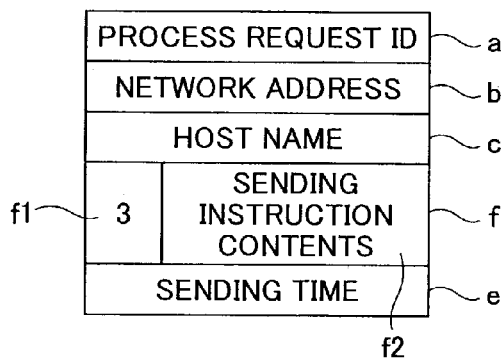
FIG. 22 is a schematic diagram illustrating information regarding hosts that can communicate.
FIG. 23 is a schematic diagram illustrating contents of a sending confirmation notification.
FIG. 24 is a schematic diagram illustrating a communication consequence table when a packet is multicast.

FIG. 21 is a flowchart of a procedure for the communication establishment confirmation process. When the extended program 112 pertaining to the communication function detects that a user clicks the mouse 11 on the communication button, the extended program 112 starts the above-mentioned communication establishment process. After that, as is shown in FIG. 21, the extended program 112 causes a communicating host displaying event for displaying information regarding hosts to which communications are established on the display 9 of the host in question (step S11). Here, the information is stored and maintained in the RAM 4 or the HDD 5 of the host. When the event is detected, the information regarding other hosts is displayed on the display 9. As is shown in FIG. 22, the information may comprise user's names, network addresses, and host names and the like. However, it is noted that the displayed information is not limited to these information items. The information may include user's images or icons that have been registered in advance.

Additionally, it is noted that the announcement method of the communicating hosts is not limited to the display method. An audio function may be used to announce the communicating hosts.

Then, the user confirms the displayed information regarding other hosts to which the communications are established.

If the desired host is not found in the displayed information, the user may cause a request packet sending host designating event.

When the user inputs the network address or the host name of the desired host to a displayed dialog box for the input, the request packet sending host designating event is driven.

When the request packet sending host designating event is driven (step S12: Y), the host of interest uses the connection type sending and receiving part 22 rather than the multicast sending part 20 to establish the communication to the desired host (step S13)

The connection type sending and receiving part 22, which belongs to the more reliable protocol TCP/IP than the UDP, is used to designate the desired host and send the request packet to the designated host. As a result, it is possible to reliably establish communication to the desired host even if the host is connected to a network via a wireless LAN such that it is difficult to transmit data under the UDP.

Heretofore, the communication establishment process (step S1) has been completed.

A description will now be given of the data communication process (step S2). Basically, the multicast sending part 20 and the multicast receiving part 21 are used for the data communication process.

After the communications to the other hosts, that is, the host B, the host C and the host D, are established, the document A in the host A uses the multicast sending part 20 of the document A to send data (multicast packet).

Then, in addition, the document A uses the connection type sending and receiving part 22 to inform the individual hosts that the data have been multicast with reference to the information regarding the hosts stored and maintained in the RAM 4 or the HDD 5 of the host A (sending confirmation notification). For instance, as is shown in. FIG. 23, a receiver response sending request ID is set to the process request ID of the notification packet. Also, the sequential number for indicating how many times the multicast is performed and the sending instruction contents are set to the sequential number of the notification packet.

Figure 25:
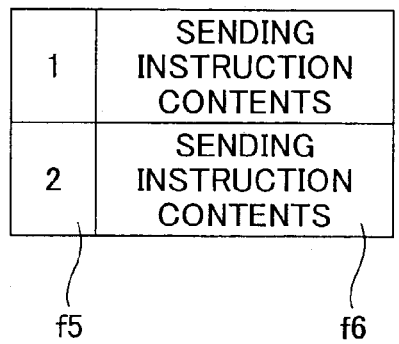
FIG. 25 is a schematic diagram illustrating sequential numbers and contents of sending instructions thereof.

Furthermore, when the data are multicast, the document A in the host A creates a communication availability table as shown in FIG. 24 and the communication availability table is stored in the RAM 4 or the HDD 5 of the host A. This communication availability table maintains the current condition on the communications to the other hosts. The document A maintains a sequential number f3 and a receiver response flag f4 for each of the hosts in the communication availability table. Additionally, as is shown in FIG. 25, the document A maintains sequential numbers f5 and sending instruction contents f6 in the communication availability table.

Figure 26:
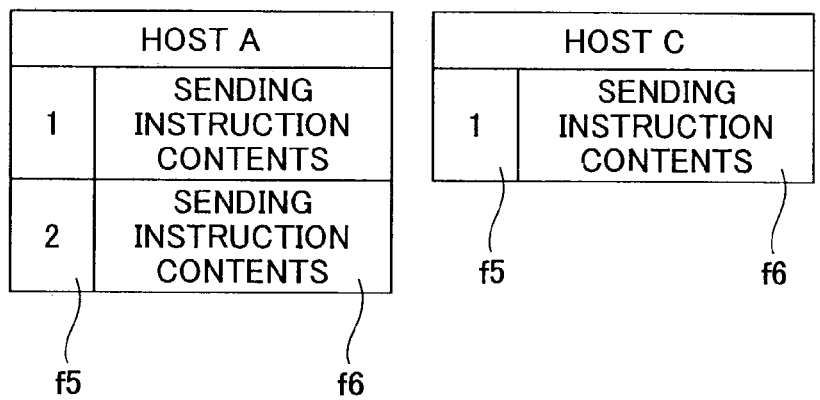
FIG. 26 is a schematic diagram illustrating sequential numbers and contents of sending instructions thereof stored for each of sender hosts.

On the other hand, as is shown in FIG. 26, the individual receiver hosts maintain sequential numbers f5 and sending instruction contents f6 for each sender host in the RAM 4 or the HDD 5 of the receiver hosts.

When the hosts receive the sending confirmation notification, the documents of the hosts process the sending confirmation notification and obtain the host name c and the sequential number f. Then, the documents determine whether or not the multicast data have been properly received based on the maintained sequential numbers and the sending instruction contents in FIG. 26.

The individual documents use the connection type sending and receiving parts 22 to reply the determination results ("TRUE" or "FALSE") as receiver response packets to the sender host A.

The host A receives the receiver response packets through the connection type sending and receiving part 22 of the host A. If the receiver response packet has "TRUE", the host A sets the receiver response flag in FIG. 24. If the receiver response packet has "FALSE", the host A fetches the sending instruction content corresponding to the sequential number and obtains the sending instruction. Then, the host A resends the data.

In the case where the data are resent, the host A uses the connection type sending and receiving part 22 to resend the data to only the host that has replied the receiving response packet having "FALSE" under the data communication process according to the first embodiment.

According to the first embodiment, it is supposed that the receiver hosts of the sending confirmation notification reply the receiver response packets to the sender host. However, the hosts may only receive the sending confirmation notifications and do not necessarily have to reply the receiver response packets to the sender host. In this case, the hosts examine that the hosts have properly received the data corresponding to the sequential number described in the sending confirmation notifications. If the data have not been properly received, the host in question may request the sender host to resend the data corresponding to the sequential number.

Also, according to the first embodiment, a host uses the multicast sending part 20 to multicast data and then the connection type sending and receiving part 22 to inform other hosts that the data have been multicast. As mentioned above, the host then uses the connection type sending and receiving part 22 to resend the data to the unsuccessful receiver host. However, after the sender host sends the sending confirmation notification, the host may use the multicast sending part 20 rather than the connection type sending and receiving part 22 to resend the data. In this case, the time restriction is set in the sending confirmation notification. After the receiver host receives the sending confirmation notification, the receiver host waits in accordance with the time restriction. If the multicast data do not arrive by the time, the receiver host may reply the receiver response packet for informing the sender host that the multicast data have not arrived.

Furthermore, the process related to the receiver response packet may be automatically performed. However, when a user sends data, it is preferable to inform the user that the data has properly arrived at the desired host. For instance, participants together with the above-mentioned sequential numbers are displayed in software fashion in a conference system. When a user sends data to hosts of other participants, if a receiver response is replied from one of the hosts, the conference system can inform the user that the data have properly arrived at the host.

A description will now be given of some special cases regarding the data communication process.

Figure 27:
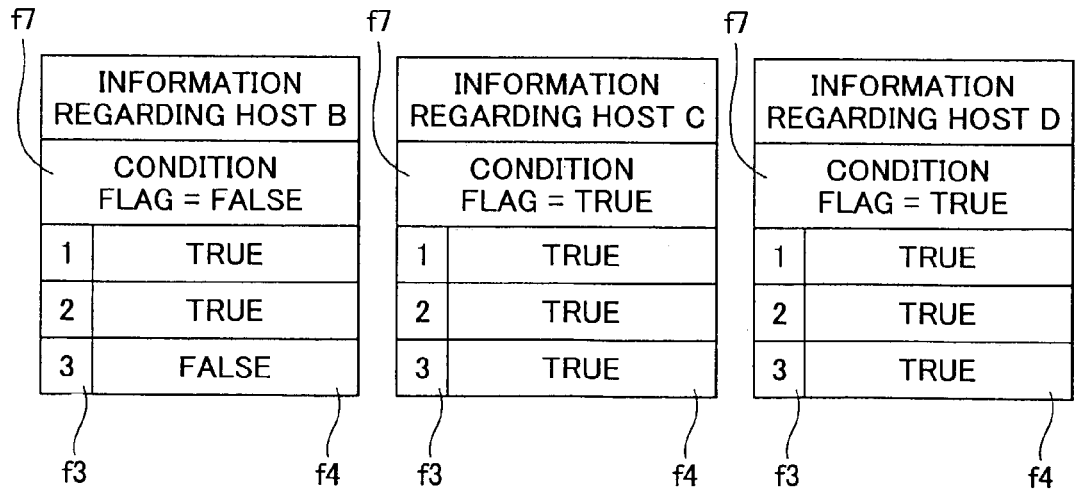
FIG. 27 is a schematic diagram illustrating a communication availability table to which environment flags are added when data are sent in the multicast form.
Figure 28:
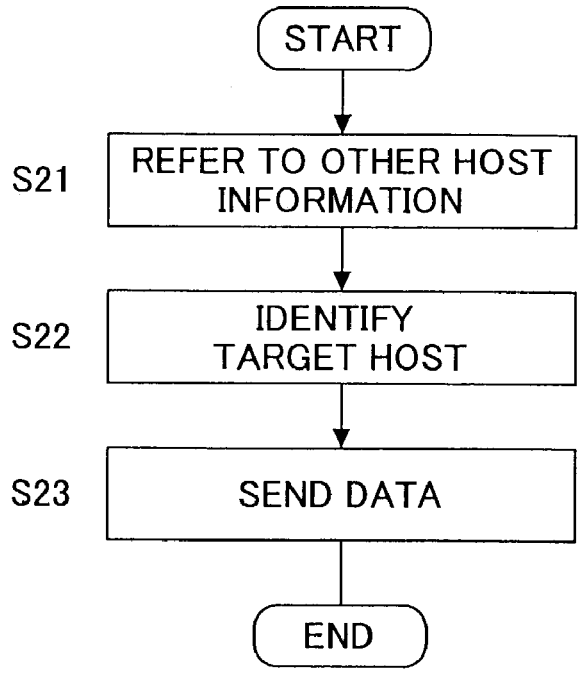
FIG. 28 is a flowchart of a procedure for sending data to only a certain host in a certain group.
Figure 29:
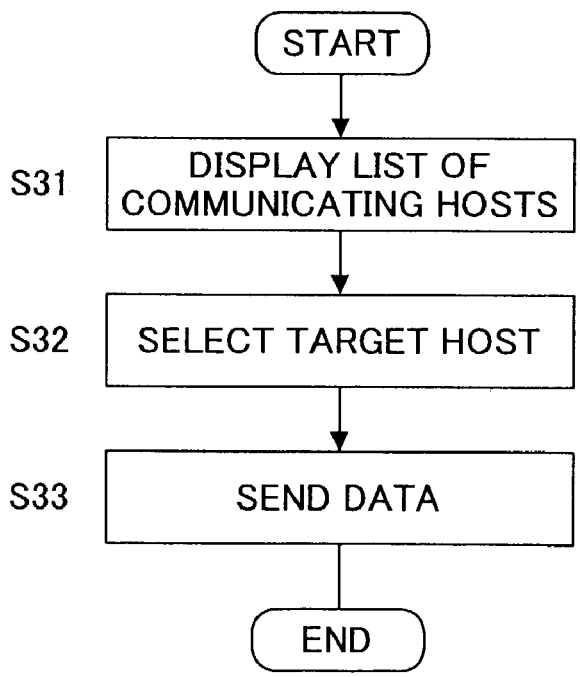
FIG. 29 is a flowchart of a procedure for selecting a certain host among hosts to which communications are established and sending data to only the selected host.

The first special case of the data communication process handles a situation where data are sent to a host located on a communication path whose communication condition is not satisfactory. As mentioned above, once a communication is established, the multicast sending part 20 is basically responsible to multicast data. However, when the data are sent to a host on a communication path whose communication condition is not satisfactory, the connection type sending and receiving part 22 may be used to send the data. The communication availability table shown in FIG. 24 is used to determine the communication condition. Furthermore, as is shown in FIG. 27, a condition flag f7 is added to the communication availability table. Initially, the condition flag f7 has "TRUE". In order to determine the communication condition, the communication availability table is examined for each communication. For instance, if there is a host whose receiver response flag f4 remains "FALSE" more than or equal to N times, the condition flag f7 of the host is set to "FALSE". When a user instructs the user's host to multicast data, the host examines the condition flags f7 of the receiver hosts. If a host has the condition flag "FALSE", the sender host uses the more reliable connection type sending and receiving part 22 to send the data to the host having "FALSE" in the condition flag f7. FIG. 27 shows an example where the condition flag f7 of the host B is set to "FALSE" due to the fact that the host B has the receiver response flag f4 "FALSE" once.

The second special case of the data communication process handles a situation where a user would like to multicast data to only hosts belonging to a subgroup in a certain group of hosts, for instance, the situation where the user would like to send the data to only hosts having the same document title. In this case, as is shown in the flowchart in FIG. 28, the user's host refers to the title d in information regarding other hosts stored in the RAM 4 or the HDD 5 of the host (step S21). Then, the user's host identifies hosts having the same document title as the user's document based on the reference (step S22) and send the data to only the identified hosts (step S23). In this case, the user's host may use the multicast sending part 22 or the connection type sending and receiving part 22 to send the data. If the multicast sending part 22 is used, a receiver response sending request ID is set to the process request ID of the multicast data. When the receiver hosts received the data, the receiver hosts inform the user's host that the multicast data properly have arrived. If the user's host cannot receive the receiving response notification from some of the receiver hosts, the user's host resends the same data. Also, as mentioned above, the user's host may ensure that the data have properly arrived by sending a sending confirmation notification.

Figure 30:
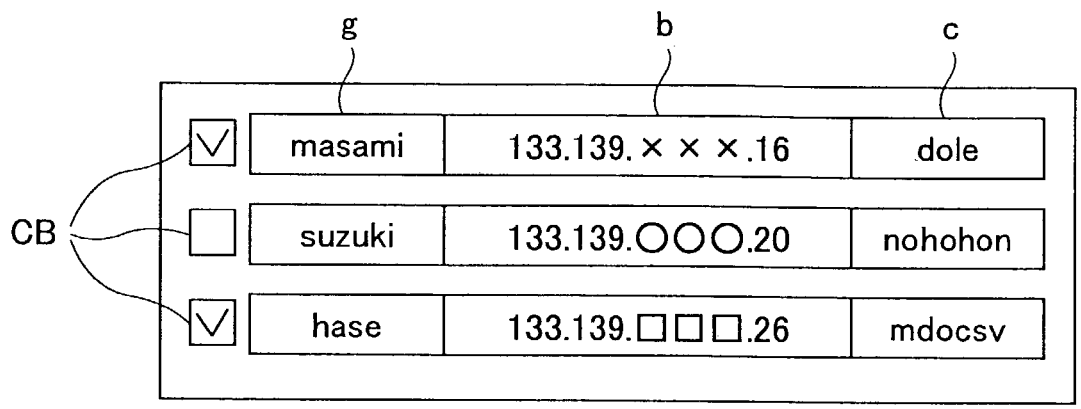
FIG. 30 is a schematic diagram illustrating displayed communicating computer information to which check boxes are added.
Figure 31:
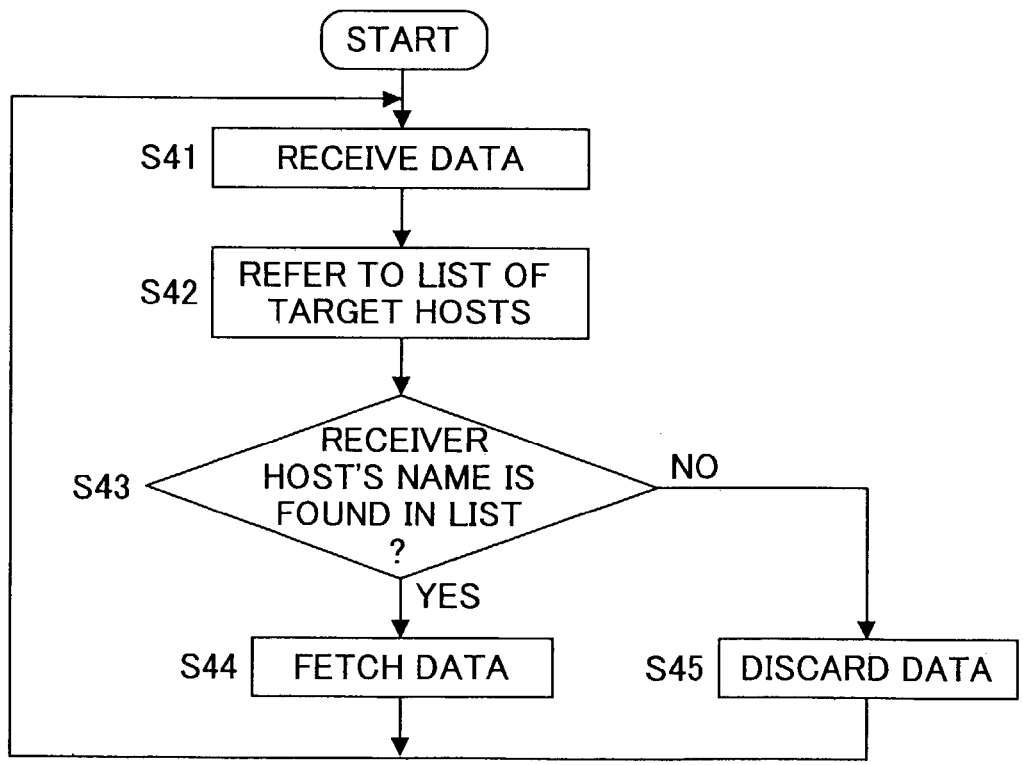
FIG. 31 is a flowchart of a procedure at a receiver host of data in a case where the data are sent in accordance with the UDP.

The third special case of the data communication process handles the similar situation to the above-mentioned second special case, that is, the situation where a user would like to multicast data to only hosts belonging to a subgroup in a certain group of hosts. Unlike the second special case, the third special case allows a user to select the hosts freely without use of information items such as the document title. For instance, the third special case works effectively in such a situation where when the user has the confidential information and would like to send the confidential information to only certain hosts rather than all hosts in a group. In this situation, based on the information regarding other hosts to which the communications are established, the user selects some hosts among the hosts to which the communications are established. As is shown in the flowchart in FIG. 29, the user's host drives the communicating host displaying event for displaying the information regarding other hosts. Theft, a list of communicating hosts is displayed on the user's host (step S31). For instance, as is shown in FIG. 30, the communicating host list may comprise user's names, network addresses and host names. It is noted that the displayed information is not limited to these information items. The displayed information may include user's images and icons that have been registered in advance.

Additionally, check boxes CB are provided at the first column of the individual communicating hosts. By checking the check boxes CB, the user can select hosts to which data should be sent. After the selection, the user's host creates a list of selected hosts (step S32) and the data are sent to only the selected hosts (step S33).

In this case, the user's host may use the multicast sending part 20 or the connection type sending and receiving part 22 to send the data. If the multicast sending part 20 is used, a receiver host performs the following processes. As is shown in the flowchart in FIG. 31, when the receiver host receives the data (step S41), the receiver host refers to the list of selected hosts (step S42). Then, if the receiver host finds a description regarding the receiver host in the list (step S43: Y), the receiver host fetches the data (step S44). If the receiver host does not find any description regarding the receiver host in the list (step S43: N), the receiver host discards the data (step S45). In this fashion, for instance, even if the UDP is used to send confidential information, a user can select certain participants freely and send the confidential information to only the certain participants rather than all participants in the conference.

The fourth special case of the data communication process handles a situation where multicast data should be encrypted. In the data communication, when data are communicated with a remote host, there is a probability that the data are intercepted. In order to prevent the data interception, when the multicast sending part 20 or the connection type sending and receiving part 22 is used to send data, it is necessary to encrypt the data.

After a communication to a host is established, the connection type sending and receiving part 22 is used to send an encryption key request packet to the host. The receiver host replies both a public key of the receiver host and information enciphered by using a private key of the receiver host. For instance, the public key and the enciphered information may be sent as the receiver response packet as shown in FIG. 18. After the sender host receives the public key and the enciphered information, the sender host uses the public key of the receiver host to decipher the enciphered information. Then, if the deciphered information coincides to information stored and maintained when the communication is established, the sender host issues a shared key to the receiver host. This shared key is valid only within a group of hosts (for instance, participants in a conference). Thus, when data are communicated in the group, a host in the group uses the shared key to encipher data and send the enciphered data to another host in the group. The receiver host uses the shared key to decipher the enciphered data. As a result, it is possible to realize more secure data communication even if either the multicast sending part 20 or the connection type sending and receiving part 22 is used. Also, since the sender host and the receiver host mutually share the public keys of the hosts, the sender host enciphers data by using the public key of the sender host and then sends the enciphered data to the receiver host. The receiver host can decipher the enciphered data by using the private key of the receiver host, and vice versa. Namely, public key cryptosystem becomes available in the data communication process according to the first embodiment. Also, on the contrary, if a host in the group enciphers data by using a private key of the host and sends the enciphered data to another host in the group, it is possible to attach an electronic signature to the data.

It takes much time to process data to which the public key cryptosystem or the electronic signature is applied. Therefore, only if required, these methods should be used. If ordinary data are communicated, it is preferable to use the shared key cryptosystem because of the high speed data communication in the shared key cryptosystem.

As is shown in FIG. 32, an obtained public key is incorporated in information regarding other hosts.

Heretofore, the data communication process (step S2) has been completed.

A description will now be given of the communication disconnection process (step S3).

In the communication disconnection process, a host sends a disconnection packet so as to disconnect communications. The disconnection request packet has a data deletion ID as the process request ID. Based upon the information regarding other hosts that the host maintains, the host sends the disconnection request packet to all hosts to which the communications are established. After the host sends the disconnection request packet, the host closes a socket of the host. Thereby, the communications to the other hosts are disconnected. When the receiver hosts receive the disconnection request packet, the receiver hosts deletes information regarding the sender host from the information regarding other hosts that the receiver hosts possess. In this fashion, the communications are disconnected. Here, when the sender host uses the multicast sending part 20 to multicast the disconnection request packet, the above-mentioned receiving confirmation notification may be used to confirm that the disconnection request packet has properly arrived. In this case, after the sender host obtains receiver responses from all hosts to which the communications are established, the socket of the sender host is closed.

Heretofore, the communication disconnection process (step S3) has been completed.

FIG. 33 shows a data communication sequence roughly illustrating a process flow from the communication establishment to the data sending process, wherein three computers 1 are called a host A, a host B and a host C for convenience, respectively and the process flow among the three hosts is explained. FIG. 33 shows an example where the host A sends data to the hosts B and C. As is shown in FIG. 33, application programs (extended programs 112 related to the communication function of the encapsulated document 101) have been already started in the hosts B and C, and the hosts B and C can communicate. When a user instructs the host A to start an application program through the mouse 11 or the keyboard 10, the application program is started in the host A. After communications to the hosts B and C are established, the host A uses the multicast sending part 20 to multicast information regarding the host A (request packet shown in FIG. 18) and informs the hosts B and C of the information regarding the host A.

When the hosts B and C receive the notification, the hosts B and C use the connection type sending and receiving part 22 to reply the information regarding the hosts B and C to the host A. In this fashion, the host A can obtain the information regarding the hosts B and C. This status is considered as the status where the communication establishment is completed.

After the communications are established, data are communicated. After (or before) the host A uses the multicast sending part 20 to multicast data, the host A sends the sending confirmation notification, which serves as the notification that the multicast is performed, to the hosts B and C by using the connection type sending and receiving part 22.

If the hosts B and C receive the data, the hosts B and C reply receiver response packets to the host A by using the connection type sending and receiving part 22.

If the host A receives no receiver response, the host A automatically performs an operation such as the operation for sending the data again.

In the above-mentioned fashion, when data are sent and received among a plurality of computers 1 connected to each other via a network, a communication is first established under the unicast connection. Then, the data are sent and received between the computers 1 to which the communication is established by selectively using the multicast communication and the unicast communication in accordance with the necessity. As a result, under the peer-to-peer network configuration without intermediate of a server, it is possible to reduce an amount of the network traffic caused by sending data and improve reliability of the multicast communication.

A description will be given of some applications to which the data communication method according to the first embodiment is applied.

A description will now be given of a first application; a conference system.

In some conferences, materials are distributed in advance. It is assumed that these materials for a conference are created by using the encapsulated document 101 having a communication function. As further assumption, participants of the conference obtain the encapsulated document 101 in advance, and the encapsulated document 101 is maintained in computers 1 of the participants, which is connected to a network, having the display 9 for displaying the encapsulated document 101. This encapsulated document 101 is used in the conference.

Figure 34:
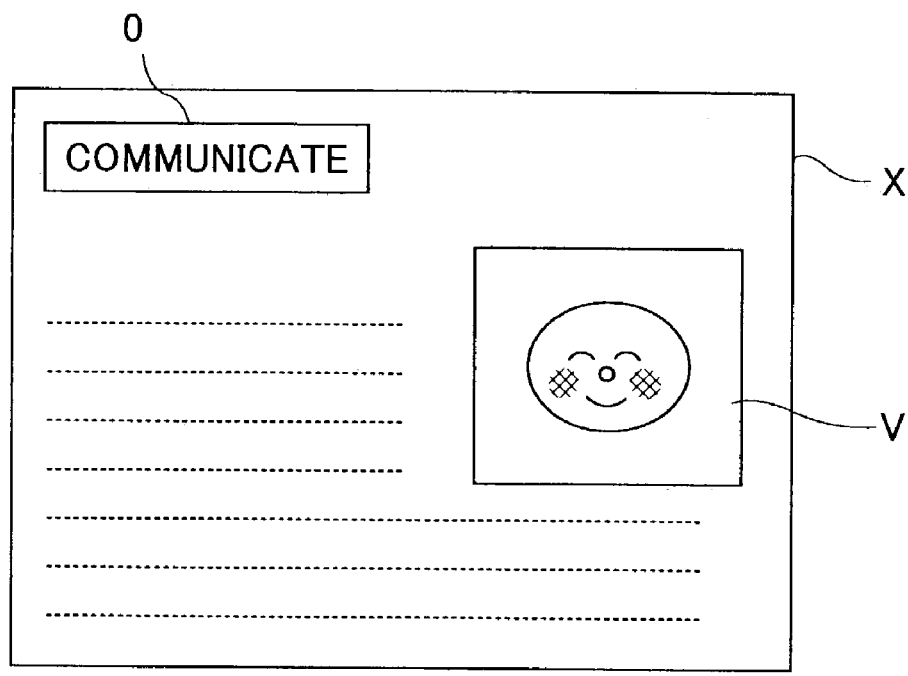
FIG. 34 is a schematic diagram illustrating a digital document displayed in a conference system.
Figure 35:
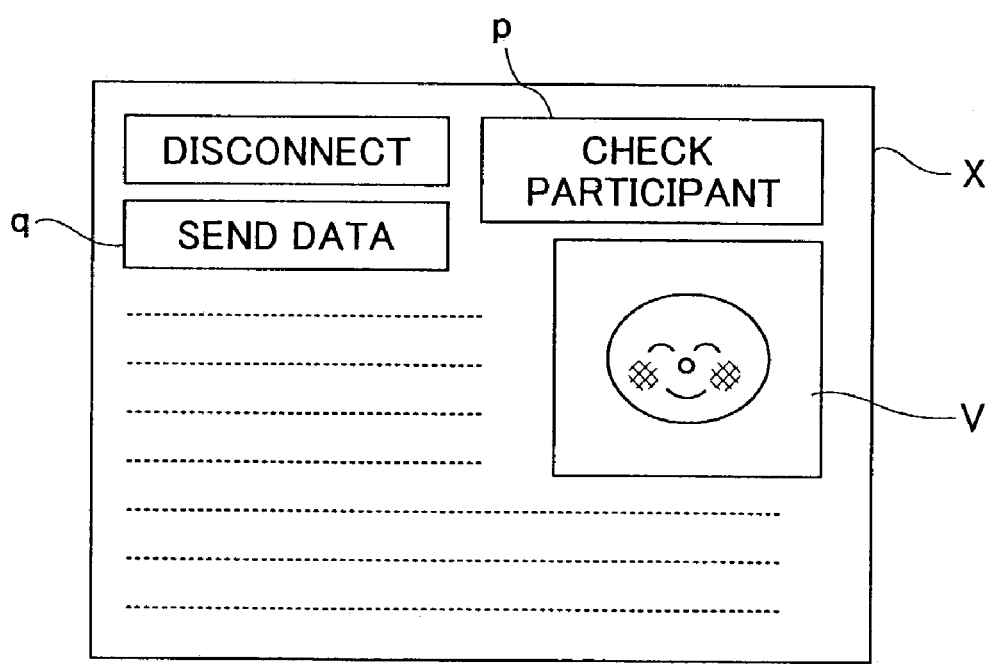
FIG. 35 is a schematic diagram illustrating the digital document when the communication is established.

First, a communication is established at start of the conference. An extended program 112 in the encapsulated document 101 performs an operation for displaying a digital information file (text information 103 and media information 104) selected by a user on the display 9. FIG. 34 shows a digital document X displayed on the display 9. As is shown in FIG. 34, a communication button O is provided on the digital document X. When the user clicks the mouse 11 on the communication button O, the multicast sending part 20 of the computer 1 multicasts a request packet. Similarly, all participants in the conference manipulate computers 1 of the participants with watching the digital document X displayed on the displays 9 of the computers 1. When the digital document X is ready to communicate, the digital document X receives a request packet from another digital document X and then send a receiver response packet to the sender host that have sent the request packet by using the connection type sending and receiving part 22. In the above fashion, the digital document X establishes the communication between the sender host and the receiver host. As a result, the hosts are ready to send and receive data regarding the conference. Here, for instance, an organizer of the conference checks whether or not the communications among all the participants are established. When the communications are established, a participant checks button p and a data sending button q as shown in FIG. 35 appear on the digital documents X. If the participant clicks the mouse 11 on the participant check button p, a list of hosts (ref. FIG. 22) to which communications are possible is displayed on the display 9 based on the information such as user's names, network addresses and host names of the hosts in the list. If there are some participants who are not in the list, the organizer inputs network addresses and host names of the participants in the dialog D shown in FIG. 22. In order to attempt to establish communications to the desired participants again, the connection type sending and receiving part 22 is used to send a request packet.

During the conference, if the mouse 11 is clicked on the data sending button q shown in FIG. 35, data are multicast by the multicast sending part 20. For instance, it is assumed that the data is condition information of a document. If the data sending button q is depressed during reproduction of a moving image V, the connection type sending and receiving part 22 informs other hosts that the data have been multicast. If a host receives the data, the moving image V is displayed on the digital document X of the host. Also, if the moving image V is sent, the same image is displayed on the digital document X of other hosts.

Basically, the multicast sending part 20 is used to send data after communications are established. However, since the UDP is used as the transport layer protocol under the multicast sending part 20, the communications cannot fulfill sufficient reliability. Thus, there is a possibility that the data do not arrive at desired hosts. In this case, the receiver response confirmation function as mentioned above always checks whether or not the data properly arrive at the desired hosts and determines whether or not a receiver response for the data is received. If the receiver response is not received, the data are sent again. The above-mentioned process is automatically performed.

Here, although the data sending button q is provided in this example, occurrence of some actions such as a page scrolling action, an image display action, and a moving image display action may trigger automatically to multicast condition information.

In the case where the embodiment is applied to a conference system, it may be necessary to communicate data to a distant host. In this case, interception of the data should be taken into account while the data are being communicated. An encryption mode for encrypting the data may be provided in order to prevent the interception. For instance, when the mouse 11 is clicked on an encryption mode button, which is not illustrated, an encryption key request packet may be sent to hosts to which communications are established and the hosts may be ready to communicate encrypted data. Also, the encryption key request packet may be automatically sent at the same time of establishment of the communication and then encrypted data may be always communicated.

In addition, there are some network devices that cannot deal with the multicast operation. In this case, it may be more suitable to use the connection type sending and receiving part 22 in order to communicate data with distant hosts.

A description will now be given of an education system to which the data communication method according to the first embodiment is applied.

In education systems, it is useful to create a textbook for a class in the form of the encapsulated document 101 having a communication function. Then, it is possible to copy the textbook to media such as CD-R and distribute the media to students taking the class. In the classroom, computers 1, which are connected via LAN, are prepared for the teacher and the students so as to display the encapsulated document 101.

Like the above-mentioned conference system, the extended program 112 executes the operation for displaying a digital information file (text information 103 or media information 104) selected based on a predetermined manipulation of a user on the display 9. When the user clicks the mouse 11 on a communication button in the textbook on the display 9, the multicast sending part 20 multicasts a request packet. Basically, it is sufficient to establish communications between the computer 1 of the teacher and the computers 1 of the students. Also, regarding students in distant places, a network address of the computer 1 of the teacher may be informed of the students in advance and the students may attempt to connect to the computer 1 of the teacher. In contrast, network addresses of the computers 1 of the students in the distant places may be informed of the teacher in advance and the teacher may attempt to connect to the computers 1 of the students. In these cases, the connection type sending and receiving part 22 is responsible to not only establish the communications but also communicate data between the computer 1 of the teacher and the computers 1 of the students in the distant places after the establishment.

In an actual class, for instance, when the teacher highlights an item that the teacher would like to emphasize and then pushes the sending button, it is possible to reflect the item to textbooks of the students. Also, for comments and questions from the students, when a student wants to ask the teacher what XXX in the page YYY is, the student opens the textbook on the display 9 to the page YYY, marks the XXX in the page YYY and pushes the sending button. Consequently, since the XXX is multicast, it is possible to demonstrate the question to the teacher and the other students. Also, when information for which privacy should be ensured such as a quiz is sent, the above-mentioned security technique may be used to communicate the information.

A description will now be given, with reference to FIG. 36, of a data communication method according to the second embodiment of the present invention wherein those parts that have been described with respect to the first embodiment are referred to the same numerals and the description thereof will be omitted. According to the first embodiment, when data are communicated, the connection type sending and receiving part 22 resends the data to only hosts from which the receiver host has received the receiver response packets being "FALSE". The second embodiment differs from the first embodiment only in that the multicast sending part 20 is used to resend the data.

The host A is assumed to receive a receiver response packet being "FALSE" from a host, which indicates that the host does not receive data, and resend the same data. In this case, the host A uses the multicast sending part 20 to send the data again under the data communication method according to the second embodiment.

However, when the same data are multicast, some hosts that have successfully received the data before would receive the same data two times. In order to eliminate the problem, when the same data are multicast, receiver hosts can determine whether or not to accept the data under the data communication method according to the second embodiment.

When it is necessary to resend data, the same sequential number as the data that have been sent before are assigned to the data that will be resent. Then, the data having the same sequential number are resent. When the receiver host receives the data, the receiver host compares the data receiving information possessed by the receiver host to the sequential number and the sender information. If the receiver host has already accommodated the data, the data are discarded. On the other hand, if the receiver host has not accommodated the data yet, the receiver host fetches the data.

Here, such data receiving information comprises the following three items: a sender host, a sequential number, and data contents. The receiver host maintains the data receiving information. For instance, the host C is supposed to maintain the data receiving information shown in FIG. 36. When the host B does not successfully receive data from the host A, the multicast sending part 20 of the sender host A resends the data "host A: sequential number 3" to the successful receiver host C as well as the unsuccessful receiver host B under the data communication method according to the second embodiment. When the host C receives the data, the host C discards the data with reference to the data receiving information. If the host C receives the data "host B: sequential number 2", the host C fetches the data because the data receiving information of the host C does not include the data. Here, hosts do not have to maintain the entire data receiving information that the hosts have received before. The hosts may maintain the most recent data receiving information. Also, the hosts may maintain the data.

Also, before the sender host uses the multicast sending part 20 to multicast data one more time, the sender host may use the connection type sending and receiving part 22 to inform the receiver host that the data are multicast again. In this case, the receiver host compares the sending confirmation notification to the data receiving information possessed by the receiver host. If the host accommodates the data, the host rejects to receive the data. In this fashion, it is possible to eliminate the problem that same data are received two times.

A description will now be given, with reference to FIG. 37, of a data communication method according to the third embodiment of the present invention. The third embodiment differs from the first embodiment in the procedure of the data communication process (step S2). For instance, in the data communication process according to the first embodiment, after data are multicast, the connection type sending and receiving part 22 is used to inform individual receiver hosts to which communications are established that the data are multicast (sending confirmation notification). In the third embodiment, such sending confirmation notification is not sent.

Figure 37:
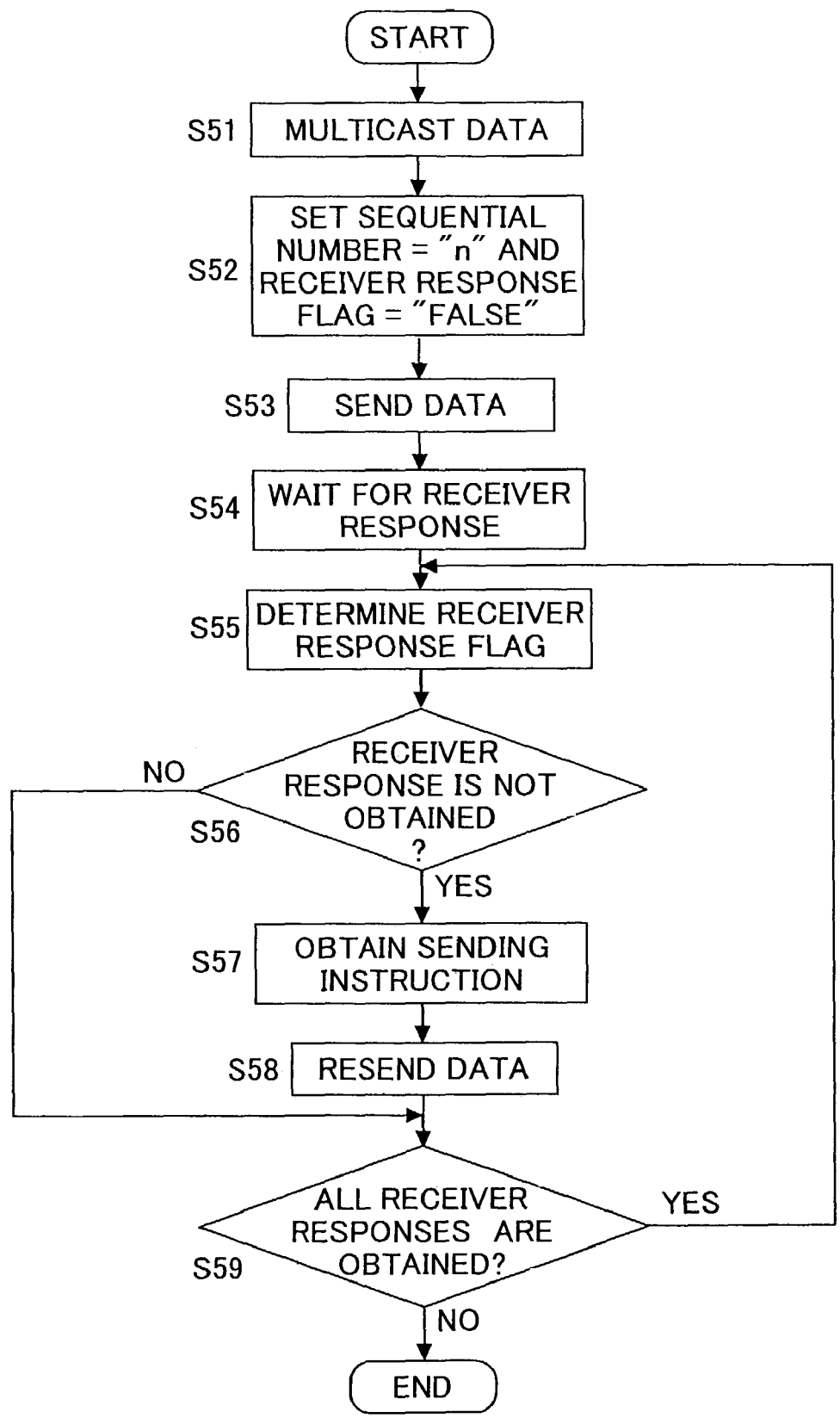
FIG. 37 is a flowchart of a procedure for a data communication process according to a third embodiment of the present invention.

FIG. 37 is a flowchart of the procedure of the data communication process according to the third embodiment. As is shown in FIG. 37, if a user instructs the host A to multicast data after establishment of communications (step S51), the document A that is driven in the host A creates a communication availability table as shown in FIG. 24 in the RAM 4 or the HDD 5. For each of the hosts (host B, host C and host D), the value "n", which indicates the number of times when the multicast has been performed, is set to the sequential number f3 and the value "FALSE" is also set to the receiver response flag f4 (step S52). In addition, for instance, the sequential number f5 and the sending instruction f6 as shown in FIG. 25 are registered.

The document A attaches the process request ID for requesting to send a receiver response packet to the data, and then the multicast sending part 20 is used to multicast the data (step S53).

In step S54, the host A waits for a predetermined time period in order to receive the receiver response packet. When the individual hosts (host B, host C and host D) receive the data in which the process request ID is set, the hosts confirm the data receiving information and use the connection type sending and receiving part 22 to reply the receiver response packets to the host A.

If the host A accepts the receiver response packet within the predetermined time period, the host A sets the receiver response flag f4 in the communication availability table for the host to the value "TRUE". Here, the receiver response packet has the same sequential number as the received data. As a result, the receiver response flag f4 remains "FALSE" for hosts from which the host A could not receive the receiver response. Based upon the sequential number, it is possible to comprehend information for determining what data arrive at which host. If there is a host for which the receiver response flag f4 remains "FALSE", the host A can conclude that the host A has not received the receiver response from the host yet because of some troubles.

When the host A waits over the predetermined time period, the host A examines the receiver response flag f4 of the sequential number "n" for each of the hosts (step S55).

FIG. 27 shows the communication availability table that the host A maintains when data are multicast the third time. In this example, it is observed that the host A does not receive the receiver response from the host B for the third multicast.

If there is a host for which the receiver response flag f4 is "TRUE" (step S56: N), it is determined that the data are successfully received by the host. On the other hand, if there is a host for which the receiver response flag f4 is "FALSE" (step S56: Y), the host A obtains a sending instruction of the sending instruction f6 based on the sequential number f5 (step S57) and then uses the connection type sending and receiving part 22 to resend the data to the host (step S58).

The steps S55 through S58 are repeated until all the hosts have the receiver response flags f4 "TRUE" for the sequential number "n" (step S59: N).

As mentioned above, when packet data are sent and received among a plurality of the computers 1 connected each other via the network, communications are established by using the unicast connection. Then, the packet data are sent by selectively using the multicast communication and the unicast communication for at least one computer 1 to which the communication is established. As a result, it is possible to reduce an amount of network traffic under the peer-to-peer network without the intermediation of a server and improve the reliability of the multicast communication.

The present invention is not limited to the specifically disclosed embodiments, and variations and modifications may be made without departing from the scope of the present invention.

The present application is based on Japanese priority application No. 2002-082056 filed Mar. 22, 2002, the entire contents of which are hereby incorporated by reference.

What is claimed is:

1. A data communication method for sending and receiving packet data between a plurality of computers connected to each other via a network, wherein each of said computers includes a multicast sending part sending packet data between said computers in a multicast form, a multicast receiving part receiving said packet data, and a connection type data sending and receiving part sending and receiving data to and from another computer of the computers in a one-to-one unicast form, the data communication method comprising:

communicating an encapsulated document including at least a digital information file, a display information file, and an operation program file, which operation program file includes a communicating program, wherein said multicast sending part, said multicast receiving part, and said connection type data sending and receiving part in respective of the computers are executed by causing said respective computers to read the communicating program of the operation program file in the encapsulated document;

establishing a unicast communication in which one computer of said computers designates another computer of said computers and establishes a communication to the another computer in the one-to-one unicast form when data are sent between said computers, based on the communication program in the encapsulated document causing the one computer and the another computer to execute at least their respective connection type data sending and receiving parts; and establishing a multicast communication from one of said computers to at least one other of the computers, based on the communication program in the encapsulated document causing the one computer and the at least one other of the computers to execute at least their respective multicast sending parts and multicast receiving parts.

2. The data communication method as claimed in claim 1, wherein said multicast sending part and said multicast receiving part use UDP (User Datagram Protocol) as a transport layer protocol and said connection type data sending and receiving part uses TCP/IP (Transmission Control Protocol/Internet Protocol) as the transport layer protocol.

3. The data communication method as claimed in claim 1, wherein said establishing a unicast communication includes a request signal sending step of using said multicast sending part of one computer of said computers to send a request packet which is said packet data for identifying a handshaking computer of said computers, a request signal receiving step of using said multicast receiving part of another computer of said computers to receive said request packet, and a connection confirmation step of using said connection type sending and receiving part of said another computer to confirm a connection between said another computer and said one computer that sends said request packet.

4. The data communication method as claimed in claim 3, wherein said request packet contains attribution information regarding said one computer that sends said request packet and a process request ID for identifying a process request toward said another computer.

5. The data communication method as claimed in claim 4, wherein said attribution information regarding said one computer contains at least a network address of said one computer.

6. The data communication method as claimed in claim 5, wherein said request signal receiving step contains a request packet sender saving step of saving contents of said request packet as request packet sender information in a storage part of said another computer that receives said request packet.

7. The data communication method as claimed in claim 3, wherein said connection confirmation step contains a communicating computer saving step of saving attribution information regarding said another computer to which connection is confirmed as communicating computer information in a storage part of said one computer that sends said request packet if said connection is confirmed.

8. The data communication method as claimed in claim 7, wherein said attribution information regarding said another computer contains at least a network address of said another computer.

9. The data communication method as claimed in claim 8, further comprising a communication established computer announcing step of announcing said communicating computer information saved in said storage part of said one computer that sends said request packet.

10. The data communication method as claimed in claim 9, further comprising a request signal resending step of using said connection type sending and receiving part of said one computer to resend said request packet to a computer of said computers to which connection is not confirmed in order to confirm the connection if said connection to said computer is not confirmed.

11. The data communication method as claimed in claim 1, wherein said establishing a multicast communication includes a data sending step of using said multicast sending part of said one computer to send said data to another computer to which communication is established, a data receiving step of using said multicast receiving part of said another computer to receive said data, and a data sending determination step of using said connection type data sending and receiving part of said one computer to determine whether or not said data are certainly sent to said another computer.

12. The data communication method as claimed in claim 11, wherein said data sending determination step contains a sending notification sending step of using said connection type data sending and receiving part of said one computer to send a sending notification packet for notifying said another computer to which communication is established that data are sent, a sending notification receiving step of using said connection type data sending and receiving part of said another computer to receive said sending notification packet, a sending condition checking step of checking whether or not said data are certainly sent to said another computer based on said sending notification packet, a result sending step of using said connection type data sending and receiving part of said another computer to send a check result to said one computer if said sending condition check step determines that said data are not sent to said another computer, and a result receiving step of said connection type data sending and receiving part of said one computer to receive said check result sent.

13. The data communication method as claimed in claim 11, further comprising a first data resending step of using said connection type data sending and receiving part of said one computer to resend data to another computer to which said data are determined not to be sent based on a determination result of said data sending determination step.

14. The data communication method as claimed in claim 11, further comprising a second data resending step of using said multicast sending part of said one computer to resend data to another computer to which communication is established and to which said data are determined not to be sent based on a determination result of said data sending determination step.

15. The data communication method as claimed in claim 14, further comprising a resending notification sending step of using said connection type data sending and receiving part of said one computer to send a sending notification packet for notifying said another computer to which communication is established that data are sent. information that is saved in said storage part of said one computer at said communicating computer saving step contains a document title included in said encapsulated document.

16. The data communication method as claimed in claim 1, wherein said multicast sending part, said multicast receiving part, and said connection type data sending and receiving part are implemented by causing said computers to read a program of the operation program file in the encapsulated document in which a digital information file, which is a representation entity of the encapsulated document, a display information file for specifying a display condition of said representation entity, and said operation program file including said program to display said representation entity and perform various functions are encapsulated, wherein said establishing a unicast communication includes a request signal sending step of using said multicast sending part of one computer of said computers to send a request packet which is said packet data for identifying a handshaking computer of said computers, a request signal receiving step of using said multicast receiving part of another computer of said computers to receive said request packet, and a connection confirmation step of using said connection type sending and receiving part of said another computer to confirm a connection between said another computer and said one computer that sends said request packet, wherein said connection confirmation step contains a communicating computer saving step of saving attribution information regarding said another computer to which connection is confirmed as communicating computer information in a storage part of said one computer that sends said request packet if said connection is confirmed, and wherein said communicating computer information that is saved in said storage part of said one computer at said communicating computer saving step contains a document title included in said encapsulated document.

17. The data communication method as claimed in claim 16, further comprising a first certain computer data sending step of identifying another computer having said document title with reference to said communicating computer information and sending data to only said another computer identified.

18. The data communication method as claimed in claim 7, further comprising a second certain computer data sending step of identifying another computer with reference to said communicating computer information and sending data to said another computer identified.

19. The data communication method as claimed in claim 18, wherein said second certain computer data sending step uses said connection type data sending and receiving part to send said data to only said another computer identified.

20. The data communication method as claimed in claim 18, wherein said second certain computer data sending step uses said multicast sending part to send said data together with information indicating that said data are sent to said another computer identified.

21. The data communication method as claimed in claim 11, further comprising a network condition determination step of determining whether or not said another computer is in a network path whose communication condition is unsatisfactory and a unsatisfactory condition data sending step of using said connection type data sending and receiving part of said one computer to send said data to said another computer if said network condition determination step determines that said another computer is in the network path whose communication condition is unsatisfactory.

22. The data communication method as claimed in claim 21, wherein said network condition determination step determines whether or not said another computer is in the network path whose communication condition is unsatisfactory based on a determination result of said data sending determination step.

23. The data communication method as claimed in claim 11, further comprising an encrypting step of encrypting said data that are sent and a decrypting step of decrypting said data encrypted that are received.

24. A data communication system for sending and receiving packet data, comprising:
a plurality of computers connected to each other via a network, each of said computers including a multicast sending part sending packet data between said computers in
a multicast form, a multicast receiving part receiving said packet data, and a connection type data sending and receiving part sending and receiving packet data to and from another computer of the computers in a one-to-one unicast form;
communicating an encapsulated document including at least a digital information file, a display information file, and an operation program file, which operation program file includes a communicating program, wherein said multicast sending part, said multicast receiving part, and said connection type data sending and receiving part in respective of the computers are executed by causing said respective computers to read the communicating program of the operation program file in the encapsulated document;
a communication establishment part establishing a unicast communication in which one computer of said computers designates another computer of said computers and establishes a communication to the another computer in the unicast form when data are sent between said computers, based on the communication program in the encapsulated document causing the one computer and the another computer to execute at least their respective connection type data sending and receiving parts; and
a data communication part establishing a multicast communication from one of said computers to at least one other of the computers based on the communication program in the encapsulated document causing the one computer and the at least one other of the computers to execute at least their respective multicast sending parts and multicast receiving parts.

25. A computer readable recording medium having stored thereon a data communication program for implementing a data communication system comprising a plurality of computers, the data communication program causing one of said computers to execute:
   a multicast sending function sending packet data between said computers in a multicast form;
   a multicast receiving function receiving said packet data;
   a connection type data sending and receiving function sending and receiving packet data to and from one of the computers and another of the computers in a one-to-one unicast form;
   a communication function communicating an encapsulated document including at least a digital information file, a display information file, and an operation program file between the at least two computers, which operation program file includes a communicating program, wherein said multicast sending function, said multicast receiving function, and said connection type data sending and receiving function are executed in respective of the computers by causing said respective computers to read the communicating program of the operation program file in the encapsulated document;
   a communication establishment function establishing a unicast communication in which one computer of said computers designates another computer of said computers and establishes a communication to the another computer in the unicast form when data are sent between said computers, based on the communication program in the encapsulated document causing the one computer and the another computer to execute at least their respective connection type data sending and receiving parts; and
   a data communication function establishing a multicast communication from one of said computers to at least one other of the computers based on the communication program in the encapsulated document causing the one computer and the at least one of the other computers to execute at least their respective multicast sending parts and multicast receiving parts.

* * * * *